US005680462A

United States Patent [19]
Miller et al.

[11] Patent Number: 5,680,462
[45] Date of Patent: Oct. 21, 1997

[54] INFORMATION ENCODER/DECODER USING CHAOTIC SYSTEMS

[75] Inventors: Samuel Lee Miller, Albuquerque; William Michael Miller, Tijeras; Paul Jackson McWhorter, Albuquerque, all of N. Mex.

[73] Assignee: Sandia Corporation, Albuquerque, N. Mex.

[21] Appl. No.: 512,518

[22] Filed: Aug. 7, 1995

[51] Int. Cl.$^6$ ........................................ H04L 9/12
[52] U.S. Cl. ........................ 380/48; 380/28; 380/46
[58] Field of Search .................... 380/28, 46, 48

[56] References Cited

U.S. PATENT DOCUMENTS

| | | | |
|---|---|---|---|
| 5,048,086 | 9/1991 | Bianco et al. | 380/28 |
| 5,245,660 | 9/1993 | Pecora et al. | 380/48 |
| 5,291,555 | 3/1994 | Cuomo et al. | 380/48 X |
| 5,365,589 | 11/1994 | Gutowitz | 380/43 |
| 5,379,346 | 1/1995 | Pecora et al. | 380/48 |
| 5,402,334 | 3/1995 | Pecora et al. | 380/46 X |
| 5,432,697 | 7/1995 | Hayes | 380/46 |

OTHER PUBLICATIONS

S. Hayes, C. Grebogi, E. Ott, and A. Mark, *Experimental Control of Chaos for Communication*, Phys. Rev. Lett. 73, 1781 (1994).

M. Ding and E. Ott, *Enhancing Synchronism of Chaotic Systems*, Phys. Rev. E. 945–948 (1994).

J. C. Sprott, *Automatic Generation of Strange Attractors*, Comput. & Graphics 17, 325 (1993).

K. M. Cuomo and A. V. Oppenheim, *Circuit Implementation of Synchronized Chaos with Applications to Communications*, Phys. Rev. Lett. 71, 65 (1993).

E. Ott, C. Gerbogi, and J. A. Yorke, *Controlling Chaos*, Phys. Rev. Lett. 64, 1196 (1990).

L. M. Pecora and T. L. Carroll, *Synchronization in Chaotic Systems*, Phys. Rev. Lett. 64, 821 (1990).

E. O. Rössler, *An Equation for Continuous Chaos*, Phys. Lett. A57, 397 (1976).

E. N. Lorenz, *Deterministic Nonperiodic Flow*, J. Atmos. Sci. 20, 130–141 (1963).

Primary Examiner—Gilberto Barron, Jr.
Attorney, Agent, or Firm—Andrew A. Abeyta

[57] ABSTRACT

The present invention discloses a chaotic system-based information encoder and decoder that operates according to a relationship defining a chaotic system. Encoder input signals modify the dynamics of the chaotic system comprising the encoder. The modifications result in chaotic, encoder output signals that contain the encoder input signals encoded within them. The encoder output signals are then capable of secure transmissions using conventional transmission techniques. A decoder receives the encoder output signals (i.e., decoder input signals) and inverts the dynamics of the encoding system to directly reconstruct the original encoder input signals.

29 Claims, 32 Drawing Sheets

Define a functional relationship between a plurality of state vector components of a state vector trajectory of an encoding system, the definition including dynamics characterized by the functional relationship, wherein at least one of the plurality of state vector components is time dependent, the encoding system being a nonlinear dynamical system, the encoding system including and being dependent on at least one system element that affects the dynamics of the encoding system.

Receive at least one encoder input signal.

Modulate the at least one system element of the encoding system with the at least one encoder input signal to affect the dynamics of the encoding system.

Determine the at least one time dependent state vector component of the functional relationship for generating at least one output signal with the at least one encoder input signal convoluted therein.

Transmit the at least one output signal to a decoding means.

Receive the at least one output signal.

Decode the at least one output signal by inverting the dynamics of the encoding system to directly reconstruct the at least one encoder input signal using the at least one output signal.

FIG. 12

INFORMATION ENCODER/DECODER USING CHAOTIC SYSTEMS

I. GOVERNMENT RIGHTS

This invention was made with United States Government support under Contract No. DE-AC04-94AL85000 awarded by the U.S. Department of Energy. The Government has certain rights in this invention.

II. BACKGROUND OF THE INVENTION

A. Field of the Invention

The present invention relates generally to the field of information encryption and decryption for secure communications. More specifically, the present invention relates to a method and systems for encoding and directly decoding information using chaotic phenomena and the inversion of system dynamics, i.e., time-dependent behavior.

B. Discussion of Related Art

In general, chaotic phenomena are those that are governed by relatively simple, deterministic rules and events, e.g., brokers buying and selling, hot air rising, heart cells beating, but that are so sensitive to slight variations that they evolve into complex, unpredictable systems, e.g., the tumult of the stock market, a storm front, a cardiac-rhythm disorder. Many researchers are now searching for methods of controlling chaos-based systems and exploiting their peculiar characteristics, such as by encoding/decoding information using chaos. Chaos is the behavior of a dynamical system whose final state depends so sensitively on the system's precise initial state that its state vector trajectory, i.e., its time-dependent path, is in effect unpredictable, even though it is deterministic.

A dynamical system is either a physical or mathematical system whose properties at a given point in time are defined by a set of quantities called the state variables, which comprise the components of a state vector, and a rule for mapping each state forward in time to other states. Generally, the state vector is multi-dimensional. The state vector of a dynamical system changes with time or some other quantity, such as an iteration number for some discrete systems. In mathematical dynamical systems, and in some physical dynamical systems, the evolution of the state vector can be described by models of mathematical equations, e.g., systems of differential equations, systems of iterated functions, etc. In some physical dynamical systems, the mathematical model describing the evolution of the state vector may not be known. The evolution of a physical system depends on the dynamical relations between the state variables, which are usually expressed as functional relations between the rates of change of the variables.

The state variables of many physical systems can be described in terms of ordinary differential equations. Differential equations involve derivatives of one or more dependent variables with respect to one or more independent variables. Ordinary differential equations involve ordinary derivatives of one or more dependent variables with respect to a single independent variable. The solutions of nonlinear ordinary differential equations are continuous flows rather than discrete maps. Other physical systems may be described by equations other than ordinary differential equations, such as partial differential equations or discrete iterative maps. The present invention utilizes the relationships of state variables of dynamical systems.

Communication of information using chaotic systems is a rapidly-developing field of research. This has been fueled by several basic discoveries. For example, one approach to information communication is to "control" chaotic systems by applying very small perturbations to the system. [E. Ott, C. Grebogi, and J. A. Yorke, *Controlling Chaos,* Phys. Rev. Lett. 64, 1196 (1990)] A method has been proposed to communicate information using the property of chaotic system control. [S. Hayes, C. Grebogi, E. Ott, and A. Mark, *Experimental Control of Chaos for Communication,* Phys. Rev. Lett. 73, 1781 (1994)] To summarize the control approach, a signal is encoded by controlling the sequence of output peaks of a chaotic oscillator by applying small amplitude perturbations to the oscillator. The receiver extracts the signal by observing the sequence of peaks of the transmitted signal.

Another approach to information communication is to use chaotic equations to produce random streams of numbers. An encryption method has been proposed using a chaotic equation to produce random numbers. [Bianco et al., *Encryption System Based on Chaos Theory,* U.S. Pat. No. 5,048,086] In summary, this inherently digital approach converts a sequence of numbers produced by a chaotic equation into binary form, adds the converted numbers to the digital data/information that is to be protected, and transmits the information to a receiver. The receiver extracts the encoded signal from the transmitted signal by generating the same sequence of binary numbers using the same chaotic equation and conversion process, and then performing modular arithmetic using this sequence and the transmitted sequence.

Yet another encryption method is taught by Gutowitz that uses dynamical systems called cellular automata to perform bit operations. [Gutowitz, *Method and Apparatus for Encryption, Decryption and Authentication Using Dynamical Systems,* U.S. Pat. No. 5,365,589] The rules governing the method in which a given cellular automaton is updated are obtained from a lookup table. Decryption is performed by iterating the dynamical cellular automaton system in the reverse direction from that used in the encryption steps.

Still another approach to information communication is to cause nonlinear dynamical systems, e.g., electrical, electromechanical, mechanical, hydraulic, optical, etc., to synchronize with chaotic systems. [L. M. Pecora and T. L. Carroll, *Synchronization in Chaotic Systems,* Phys. Rev. Lett. 64, 821 (1990); M. Ding and E. Ott, *Enhancing Synchronism of Chaotic Systems,* Phys. Rev. E. 945–948 (1994); Pecora et al., *System for Producing Synchronized Signals,* U.S. Pat. No. 5,245,660; Pecora et al., *Cascading Synchronized Chaotic Systems,* U.S. Pat. No. 5,379,346] Cuomo et al. describe a method of applying the phenomenon of "synchronization of chaotic systems" to communicate information. [Cuomo et al., *Communication Using Synchronized Chaotic Systems,* U.S. Pat. No. 5,291,555; K. M. Cuomo and A. V. Oppenheim, *Circuit Implementation of Synchronized Chaos with Applications to Communications,* Phys. Rev. Lett. 71, 65 (1993)] The "synchronization chaotic systems" phenomenon was originally taught by Pecora et al. in U.S. Pat. No. 5,245,660. In Cuomo et al., a parameter of a chaotic system is modulated (varied) with an information bearing signal. The chaotic system produces a chaotic signal that contains within it the information. The resultant chaotic signal is transmitted using conventional transmission techniques to a special receiver. The receiver synchronizes with the received chaotic signal permitting reconstruction of the original information bearing signal. Comparison of the chaotic signal from the encoder is made with the synchronization signal to extract the original encoded information. The fundamental basis for the Cuomo et al. invention is the synchronization that occurs between the chaotic transmitter and the matched receiver.

Information obtained from chaotic signals using the synchronization property is inherently noisy. Synchronization errors are due in part to the finite time required for synchronization to occur. Also, when the modulated parameter spans too large a range, synchronization becomes approximate. Synchronization is a fundamental requirement for this technique to work. For synchronization to occur, the largest Lyapunov exponent of the receiver system must be negative, i.e., the receiver must be a stable system. An alternative to the synchronization technique for determining parameter modulation is desired, not only for communication applications, but also for applications involving the basic characterization of chaotic physical systems.

A more extensive survey of the above, and similar, communication systems based on properties of chaotic systems is provided in the volume *Chaos in Communications*, edited by L. M. Pecora, SPIE—The International Society for Optical Engineering, Vol. 2038 (1993).

As evident from the foregoing discussion, many different types of coding have been developed, studied, and employed in an attempt to optimize the performance of information encoding and decoding. While these codings are operable in various situations, there remains a need for secure encryption/decryption methods. The present invention fulfills this need and further provides related advantages.

The present invention discloses a method and apparatus that is capable of directly extracting information from chaotic signals (i.e., without using "control" or "synchronization" techniques), which has not been previously enjoyed by those skilled in the art. Direct extracting (decoding) is achieved by inverting the dynamics, i.e., anything that impacts or affects the operation or function of the dynamical system, of the chaotic encoding system. The present invention does not depend upon the use of the "synchronization" property of chaotic systems that is required for other communications schemes based on chaos. The present invention has no requirements regarding the Lyapunov exponents of the system, in contrast to the systems that make use of the synchronization property. Additionally, the present invention does not involve "control" of chaotic systems. The present invention can encode and decode both analog and digital signals. The direct decoding technique of the present invention is applied in the area of information or communication encryption/decryption to create an information encoding/decoding system.

III. SUMMARY OF THE INVENTION

The principal object of the present invention is to provide a chaos-based method and apparatus for encoding and directly decoding information from chaotic signals for secure communications.

It is another object of the present invention to provide a method and apparatus for inverting the dynamics of the chaotic encoding system to directly decode information.

It is a further object of the present invention to provide a method and apparatus for encoding and directly decoding information using dynamical systems.

It is still another object of the present invention to eliminate the necessity to employ conventional control, synchronization techniques, or lookup tables to decode information produced by chaotic systems.

Additional objects, advantages, and novel features will become apparent to those skilled in the art upon examination of the following description or may be learned by practice of the present invention. The objects and advantages of the present invention may be realized and attained by means of the instrumentalities and combinations particularly pointed out in the appended claims.

Accordingly, the present invention accomplishes the foregoing objects by providing a method and apparatus for encoding and decoding information based on chaos, which may be implemented either in hardware (physical system) or software (numerical model of a physical system). In a preferred embodiment of the present invention there is provided an apparatus that comprises at least one chaotic encoding system at a first location for encoding information, the encoding system comprising a nonlinear dynamical system. The encoding system receives at least one encoder input signal $m_i(t)$ at an encoding input port or similar means and generates at least one corresponding encoder output signal $S_k(t)$, which is a chaotic signal. The encoder input signal $m_i(t)$ (comprising the information stream to be encoded) modulates at least one of the system parameters $P_j(t)$, which may be constant or time dependent, of the dynamical encoding system, thereby impacting or affecting its dynamics, i.e., its time-dependent behavior. The system parameters are any quantity or element that varies the dynamics of a given system. The dynamical encoding system is integrated to generate chaotic signals containing the time-dependent encoder input signals $m_i(t)$ and other information convoluted within them. The chaotic signals comprise a state vector trajectory whose state vector components, for appropriately chosen system parameters by those skilled in the art, vary chaotically with time. The resulting chaotic signals display considerable complexity and unpredictability, permitting the transmission of very secure signals to a decoding system using conventional transmission techniques, e.g., telephone lines, optical fibers, microwave transmissions, etc.

A decoding system at a second location receives at least one decoder input signal (which is the same as the chaotic, encoder output signal) at a decoding input port or similar means and generates at least one corresponding decoder output signal, which is comprised of the original encoder input signal. The decoding system operates on the decoder input signal received from the encoding system to decode and directly reconstruct the original encoder input signal by inverting the dynamics of the encoding system through a manipulation of equations that define the dynamics of the encoding system. Decoding the chaotic signals is extremely difficult, if not fundamentally impossible, without the proper decoding information, which is comprised of the encoding system parameters. Thus, a very secure information encryption/decryption system is achieved by the present invention.

In one aspect of the present invention there is provided a method of encoding and decoding information streams, comprising the steps of defining a specific local or functional relationship for a nonlinear dynamical encoding system, the definition including dynamics characterized by a specific local relationship between a plurality of state vector components of a state vector trajectory of the encoding system, wherein at least one of the plurality of state vector components is time dependent, the encoding system including and being dependent on system parameters that characterize and impact the dynamics of the encoding system; receiving encoder input signals at a first location; modulating the system parameters of the encoding system with the encoder input signals to impact the dynamics of the encoding system; determining the state vector component of the specific local relationship that is time dependent for generating chaotic signals with the encoder input signals convoluted therein; transmitting the chaotic signals to a second location; receiving the chaotic signals at the second location; and decoding the chaotic signals by inverting the dynamics of the encoding system to directly reconstruct the encoder input signals using the chaotic signals.

The present invention permits decoding of multiple modulated parameters from a single chaotic encoding system. The chaotic, output signals generated by the encoder are never the same, even when the identical information is encoded. The present invention also allows the simultaneous encoding of multiple, independent information streams (time-varying coefficients) that can be automatically and simultaneously encoded using a single, nonlinear dynamical system. Information streams (message input signals) may be distributed between different chaotic, encoded signals. In the case of a multiple input encoder, the input signal information typically becomes encoded in more than one component of the state vector trajectory, which requires the presence of the same multiple chaotic signals to decode any one input signal. The maximum number of independent information streams that can be encoded/decoded is related to the number of dimensions of the nonlinear dynamical encoding system.

Further scope of applicability of the present invention will become apparent from the detailed description of the invention provided hereinafter. It should be understood, however, that the detailed description and specific examples, while indicating preferred embodiments of the present invention, are provided for illustration purposes only because various changes and modifications within the spirit and scope of the invention will become apparent to those of ordinary skill in the art from the detailed description of the invention that follows.

IV. BRIEF DESCRIPTION OF THE FIGURES

The accompanying figures, which are incorporated in and form part of the specification, further illustrate the present invention and, together with the detailed description of the invention, serve to explain the principles of the invention.

FIG. 12 is a block diagram of the method in accordance with the present invention.

V. DETAILED DESCRIPTION OF THE INVENTION

Figure 1:
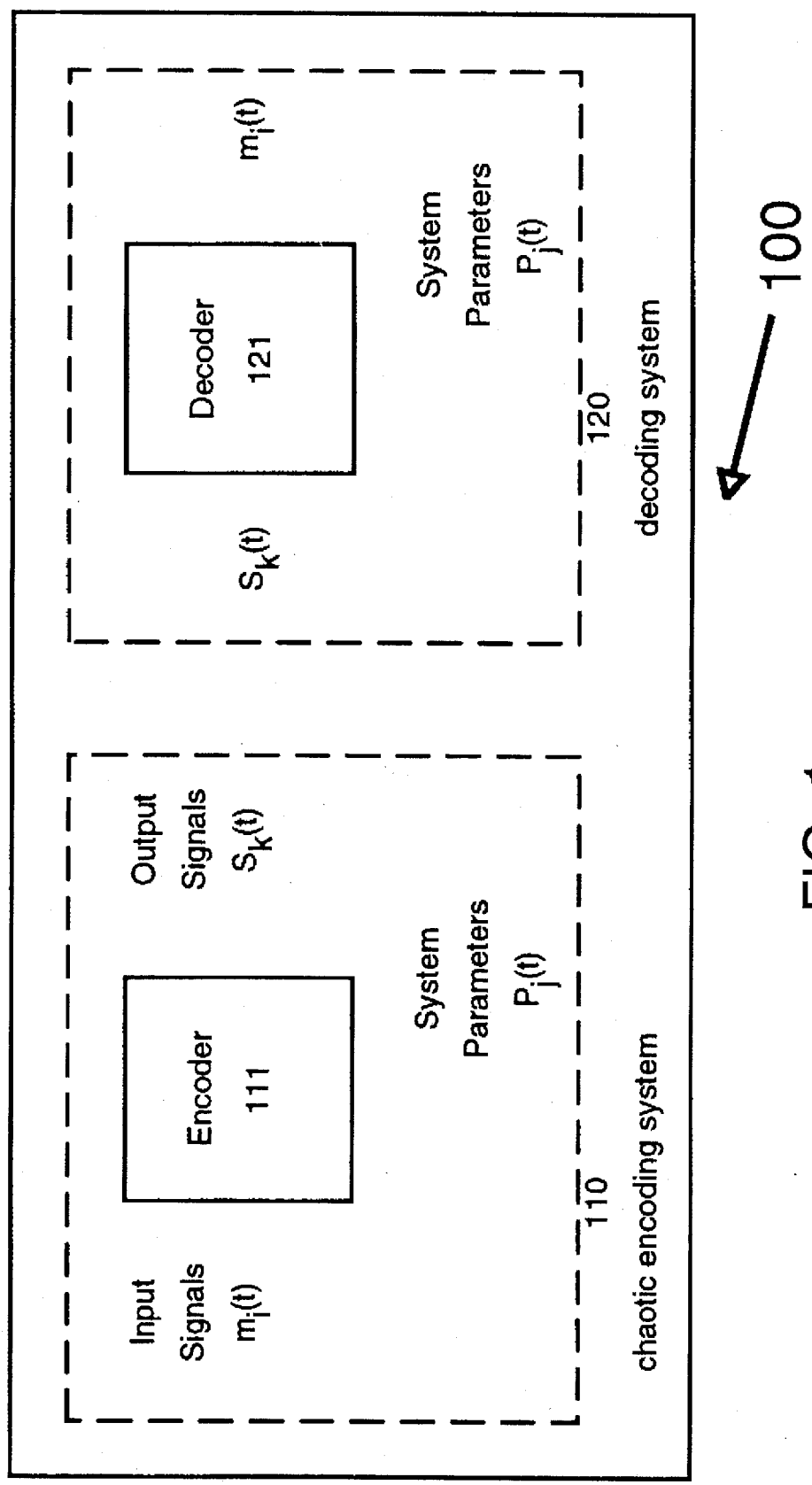
FIG. 1 is a block diagram of an information encoding/decoding system (100) comprising system parameters that may be altered to impact the encoding system dynamics, in accordance with the present invention.

In the interest of introducing the present invention in a simplified manner, the following brief discussion is presented first to introduce the fairly complex intricacies of the present invention. A dynamical system may be thought of as a physical system whose configuration, or state, changes with time. For example, the speed and height of a simple swinging pendulum changes as time elapses. The two quantities, speed and height, define the state of the pendulum at any instant in time. Hence, they can be used to define the components of a mathematical concept called a state vector. The state vector of the simple pendulum system is two dimensional since it has two components (speed and height). A more complex dynamical system could have a state vector that has many dimensions, if many quantities are necessary to describe its state at any instant in time. The state vector of a physical dynamical system can often be approximated by mathematical equations that describe how the components of the state vector change with time. For example, one can write a differential equation whose solution describes the motion of the pendulum. Parameters that impact the dynamics of the pendulum, i.e., its time-dependent behavior, include the mass and length of the pendulum. If the mass or length of the pendulum was somehow caused to change while it was swinging, its dynamics would clearly be altered. Typically, the generic term "dynamical system" can refer either to the physical system (pendulum) or to the mathematical equations describing the state vector of the system (equations describing the pendulum motion). The generic term "system parameter" refers to any parameter of the dynamical system that causes its dynamics to change, the parameter being associated either with the physical system or the mathematical system. The term "chaotic system" refers to a dynamical system whose state vector exhibits a special type of behavior. The time-dependent path (trajectory) of the multidimensional state vector of a chaotic system typically appears random, does not repeat itself, and is very sensitive to the initial value of the trajectory.

In the present invention, information is encoded using a dynamical system and is decoded by inverting the specification of the dynamical system, i.e., by inverting its dynamics. The steps of the method for encoding and decoding information in a dynamical system are outlined in FIG. 12. First, a suitable dynamical system is specified by one of ordinary skill in the art. For the case of a mathematically defined dynamical system, the specification might include three state vector components $x(t)$, $y(t)$, and $z(t)$ whose time dependence is defined by a set of differential equations, such as shown in Eqs. (1)–(3). The equations contain system parameters whose values impact the dynamics of the system. At least one information signal is coupled to at least one system parameter, so that when the value of the information signal changes, the dynamics of the dynamical system also changes. Once the dynamical system (a mathematical system in the present example) is specified, the equations are solved (integrated) using the information signal that is to be encrypted. The resulting state vector components contain encoded within them the information signal. The state vector components $x(t)$, $y(t)$, and $z(t)$ are then transmitted to a decoder. The decoder is specified by inverting the specification of the encoding dynamical system so that the original information signal is defined in terms of the transmitted state vector components and the values of the system parameters used to perform the encoding, such as shown in Eqs. (4)–(6). The decoder then acts on the transmitted signals to directly produce the original information signal. While it is not necessary for the encoding dynamical system to be chaotic, the level of security of the encoded signal may be higher when it is chaotic. Thus, the sequence of events of this simplified introduction involve specifying a dynamical system, causing the dynamical system to evolve with time while its dynamics are modified by the information signal, transmitting the time-dependent state vector of the dynamical system as the encoded signal, specifying a decoder by inverting the specification of the dynamical encoding system, and acting on the transmitted signals by the decoder to directly produce the original information signal.

The information encoding/decoding system (100) of a preferred embodiment of the present invention, as illustrated in FIG. 1, is comprised of two primary components: an encoding system and a decoding system. The encoding system (110) comprises a nonlinear, dynamical system encoder (111). The nonlinear, dynamical encoding/decoding system (100) may be operated in either a chaotic or non-chaotic mode. In a chaotic mode, however, the security level of the encrypted information will be higher. The encoder (111) may be a chaotic, dynamical system that either oscillates on its own, i.e., is autonomous, or is externally driven, i.e., is nonautonomous. The encoder (111) is capable of encoding multiple input signals automatically and simultaneously.

The encoding system (110) receives and encodes one or more encoder input signals $m_i(t)$ at an encoding input port or equivalent means (where "i" denotes the number of encoder input signals to be encoded). The encoding system (110) further comprises at least one system parameter that impacts the dynamics of the encoding system. The system parameters, $P_j(t)$ (where "j" denotes the number of parameters present), may be caused to vary by the encoder input signals $m_i(t)$, or by other means, that are not directly coupled to the encoder input signals $m_i(t)$. The system parameters may include, for example, at least one parameter, signal, e.g., analog or digital electrical signal, time delay, or any other appropriate quantity or element known by those of ordinary skill in the art to impact the dynamics of a dynamical system. Any given parameter $P_j(t)$ may remain constant or may be time dependent. The encoding is accomplished by causing the encoder input signals $m_i(t)$ to modulate (cause variations to the characteristics of) system parameters $P_j(t)$ with the information stream to be transmitted thereby impacting the dynamics of the encoding system (110). Thus, information streams are encoded by coupling a time-varying input signal $m_i(t)$ to one or more system parameters $P_j(t)$. The encoding system (110) generates encoder output signals $S_k(t)$ that comprise the encoder input signals $m_i(t)$ encoded (convoluted) within them. Encoder output signals $S_k(t)$ comprise a plurality of chaotic signals, which exhibit characteristics of spread spectrum transmitted signals, that represent the dynamic state variables that define the state of the dynamical system. For example, a three dimensional encoding/decoding system may be configured to generate three chaotic signals $x(t)$, $y(t)$, and $z(t)$, collectively referred to herein as $S_k(t)$.

The decoding system (120) receives the encoder output signals $S_k(t)$ from encoding system (110) at a decoding input port or equivalent means and directly reconstructs the original encoder input signals $m_i(t)$. The decoder output signal is substantially identical to the original encoder input signal. The decoding of the encoder output signals $S_k(t)$ is accomplished by inverting the dynamics of the encoding system (110) as discussed herein. Accordingly, the decoder definitions will correspond to the encoder definitions used (see e.g., Eqs. (1)–(3) and Eqs. (4)–(6) below), which define a chaotic system. The decoding process is independent of any past history of the encoding system. Thus, the inherent sensitivities and unpredictability associated with chaotic systems do not prevent the extraction of information from encoded, chaotic signals when the underlying dynamics are known.

Referring to FIG. 1 again, there is shown an information encoding/decoding system (100) in accordance with the present invention. The encoding/decoding system (100) enables the implementation of cryptographic key systems. As stated earlier, the maximum number of independent information streams that can be encoded/decoded is related to the number of dimensions of the nonlinear, dynamical encoding system. In a preferred embodiment, the signal encoding system (110) is a three-dimensional system. Because the system is three-dimensional, three dynamic state variables are needed to define the state of the system. Accordingly, the encoding system (110) is configured to produce chaotic signals x(t), y(t), and z(t), collectively referred to herein as $S_k(t)$, in accordance with coupled, ordinary nonlinear differential Eqs. (1)–(3) as presented below:

$$\frac{dx(t)}{dt} = P_1 y(t)z(t) + P_2 m_1(t) \tag{1}$$

$$\frac{dy(t)}{dt} = P_3 x(t)m_2(t) + P_4 y(t) + P_5 \tag{2}$$

$$\frac{dz(t)}{dt} = P_6 x(t)y(t) + P_7 y(t) + P_8 m_3(t) \tag{3}$$

Definitional Eqs. (1)–(3) comprise the publicly known information; the values of the system parameters $P_j(t)$, however, are not publicly known. Thus, the "key" to the encoding/decoding system is comprised of the system parameters $P_j(t)$, which are selected in a manner known to those skilled in the art so that the encoding/decoding system operates in a chaotic mode. The values of $P_j(t)$ may also be caused to vary real-time in situations where an even more secure transmission is desired. Of course, the values of $P_j(t)$ must be provided to the decoding system (120) to decode the information. As discussed earlier, a system parameter $P_j(t)$ from each differential equation (1)–(3) can be coupled to one or more input signals $m_i(t)$. The system parameters $P_j(t)$ are comprised, for example, of the values of the coefficients occurring in the differential equations (1)–(3), which may be constant or vary with time, or of the values of resistors, capacitors, inductors, etc., in an electric circuit.

In this preferred embodiment, three message input signals $m_1(t)$, $m_2(t)$, and $m_3(t)$ modify the dynamics of the encoding system (110). To encode time dependent input signals $m_1(t)$, $m_2(t)$, and $m_3(t)$, Eqs. (1)–(3) are numerically integrated in time, e.g., using a 4th order Runge-Kutta integration method, choosing an initial time and time increment to obtain the state vector trajectory of the dynamical system (time dependent solutions) with the desired information-containing signals $m_1(t)$, $m_2(t)$, and $m_3(t)$ convoluted within the three state vector components. The signals are then available at encoder output ports for transmission to the decoder. The three-dimensional state vector trajectory will follow a chaotic trajectory, even when the system parameters remain constant, and will comprise information encoded within it regarding the system parameters $P_j(t)$ and input signals $m_i(t)$. The resulting state vector components x(t), y(t), and z(t) are chaotic signals, which are transmitted to the decoding system (120) using conventional transmission techniques. Transmission of public signals x(t), y(t), and z(t) does not need to be continuous, i.e., transmission may be frequently interrupted to allow the transmission of frequent, but very short, bursts of information. Also, the state vector components can be scaled and offset to facilitate the implementation and evaluation of the differential equations defining the chaotic system.

The decoding system (120) receives the encoded, transmitted signals x(t), y(t), and z(t) from encoder (111) and directly reconstructs the original, encoder input signals $m_1(t)$, $m_2(t)$, and $m_3(t)$, which are available at decoder output ports or equivalent means. More specifically, the decoder (121) reconstructs the original input signals by inverting the dynamics of the encoder (111) when solving the equations for the input signals, in accordance with Eqs. (4)–(6) as presented below:

$$m_1(t) = \frac{\frac{dx(t)}{dt} - P_1 y(t)z(t)}{P_2} \tag{4}$$

$$m_2(t) = \frac{\frac{dy(t)}{dt} - P_4 y(t) - P_5}{P_3 x(t)} \tag{5}$$

$$m_3(t) = \frac{\frac{dz(t)}{dt} - P_6 x(t)y(t) - P_7 y(t)}{P_8} \tag{6}$$

The set of decoding Eqs. (4)–(6) are derived from Eqs. (1)–(3), respectively, by solving the equations for the three encoder input signals (i.e., solving Eqs. (1)–(3) for $m_1(t)$, $m_2(t)$, and $m_3(t)$). The parameters $P_j(t)$ to perform the decoding have the same values as those used to perform the encoding. It is noted that the decoding process is independent of any past history of the encoding system. Thus, the inherent sensitivities and unpredictability associated with chaotic systems do not prevent the extraction of information from chaotic signals when the underlying dynamics (which depend on the system parameters $P_j(t)$) are known. In this preferred embodiment, Eqs. (4)–(6) are evaluated numerically by inverting Eqs. (1)–(3), which represent the dynamics of the encoding system (110), to directly obtain the original three input signals $m_1(t)$, $m_2(t)$, and $m_3(t)$. While the coupled sets of encoding Equations (1)–(3) and decoding Equations (4)–(6) have been listed to illustrate the present invention, it is possible to implement an encoding/decoding system in accordance with the present invention using any set of equations defining a chaotic system. For example, those skilled in the art are aware that the well-known Lorenz equations [E. N. Lorenz, *Deterministic Nonperiodic Flow*, J. Atmos. Sci. 20, 130–141 (1963)], or other less or more complex equations, can define a chaotic system. The well-known Lorenz equations are represented by three coupled ordinary differential equations, which contain two nonlinear terms (of second order, x(t)y(t) and x(t)z(t)):

$$\frac{dx(t)}{dt} = \sigma(-x(t) + y(t)); \tag{7}$$

$$\frac{dy(t)}{dt} = rx(t) - y(t) - x(t)z(t);$$

$$\frac{dz(t)}{dt} = -bz(t) + x(t)y(t).$$

The Lorenz dynamical system can be used as an encoder/decoder system according to the present invention by defining the system as, for example:

$$\frac{dx(t)}{dt} = m_1(t)P_1 x(t) + P_2 y(t); \tag{8}$$

$$\frac{dy(t)}{dt} = m_2(t)P_3 x(t) + P_4 y(t) + P_5 x(t)z(t);$$

$$\frac{dx(t)}{dt} = m_3(t)P_6 z(t) + P_7 x(t)y(t),$$

where the input signals $m_1(t)$, $m_2(t)$, and $m_3(t)$ fluctuate about the value (+1). In the Lorenz nonlinear, autonomous, system presented in Eq. (8), the parameters $P_1=(-\sigma)$, $P_2=(+\sigma)$, $P_3=(+r)$, $P_4=(-1)$, $P_5=(-1)$, $P_6=(-b)$, and $P_7=(+1)$ and are constant.

A property associated with chaotic dynamical systems is the fundamental inability to predict, either forward or backward in time, the state vector trajectory of the dynamical system. In addition, an infinitesimal perturbation can cause the state vector trajectory to diverge drastically from its unperturbed path contributing further to the unpredictability of chaotic systems. In spite of these fundamental properties, the present invention provides a method and apparatus to extract information from chaotic signals originating from nonlinear dynamical systems. The method and apparatus of the present invention are based upon another property of chaotic systems, namely, a specific local relationship maintained between state vector components of the system state vector trajectory. Due to the inherent sensitivity of chaotic systems to initial conditions, the state vector trajectory of the dynamical encoding system will always be different (unless deliberately reset to the same initial conditions), even when the same information is encoded. Although the state vector trajectory itself is chaotic and unpredictable, the specific local relationship is always maintained between the values of its state vector components. At each instant in time, the deterministic, but unpredictable, state vector trajectory obeys the underlying dynamics governing the chaotic system. Therefore, the ability to directly decode information from chaotic signals is made possible regardless of the initial value of the state vector the encoder. In the present invention, the specific local relationship is maintained by the coupled set of Eqs. (1)–(3) that define the encoding/decoding system.

The fact that the present invention is capable of implementation in either software or hardware, or both, was emphasized earlier in the discussion. Certain information, however, must be known in order to build an operable decoding system. In any implementation, however, the components of the state vector trajectory characterizing the architecture of the encoding system must be known. The information required differs slightly depending upon the choice of implementation of the decoding system. In a computer-based software implementation, the definition of the chaotic encoding system and the values of the system parameters (and the buffer system contents in encoder (700) presented below) must be known to be able to reconstruct the original input signals from the encoded, chaotic signals. In a hardware implementation, the decoding system must be constructed to correspond to the encoding system except with an added inversion capability (as in FIGS. 3–5) in accordance with the equations that define the encoder and decoder. In a hardware implementation, such as an electrical circuit, components sometimes cannot be modeled precisely in closed form in terms of known functions, as in the computer-based software implementation, because of the inherent complex and nonlinear behavior of physical systems. Therefore, unauthorized decoding becomes extremely difficult because of the fact that an unauthorized decoding system must physically duplicate an authorized decoding system, or mathematically model it with sufficient accuracy. Either attempt can be extremely difficult. Because the encoder is a nonlinear dynamical system, the encoding function is extremely sensitive to the system parameter values of the components comprising the encoder, particularly when operated in a chaotic mode. Even if the architecture of the encoding circuit is determined, the exact system parameter values of all the components cannot be easily reproduced. The fabrication of a matched pair of an encoder and a decoder is made possible with integrated circuit technology, e.g., two adjacent sites on a silicon wafer will be very nearly identical. It is not necessary to actually know or achieve exact target values of the system parameters; they simply must be sufficiently the same and sufficiently close to the target values that result in chaotic behavior. Additionally, the fundamental nature of the encoding process is such that the likelihood that the encoder could be duplicated by examining the input and output signals is minimal. Even if the authorized decoding system is duplicated, a common key, i.e., the system elements or components, to that of the encoding system is still required to decode the encoded signals.

A. EXAMPLE 1

The particular values and configurations discussed in this non-limiting Example 1 can be varied and are cited merely to illustrate a preferred embodiment of the present invention operating in the chaotic regime, and are not intended to limit the scope of the invention. In the following example of this preferred embodiment, the present invention was implemented by a computer program embodied in a tangible medium, i.e., a computer's hard disk drive, and subsequently loaded into the computer's random access memory, and executed for processing by the computer's microprocessor. Any computer program storage device readable by a machine, tangibly embodying a program of instructions executable by the machine to perform the method for interactively receiving, encoding, transmitting, and decoding the input signals will suffice. The computer program code directed the computer to receive input signals, from a signal generator for instance, encoded the signals in a chaotic manner, transmitted the encoded signals to a decoder, and the decoder decoded the encoded signals by inverting the dynamics of the encoding system to directly reconstruct the original input signal. The programmed computer became the encoding/decoding system. The encoding and decoding process may be performed by one or more computers.

Figure 1A:
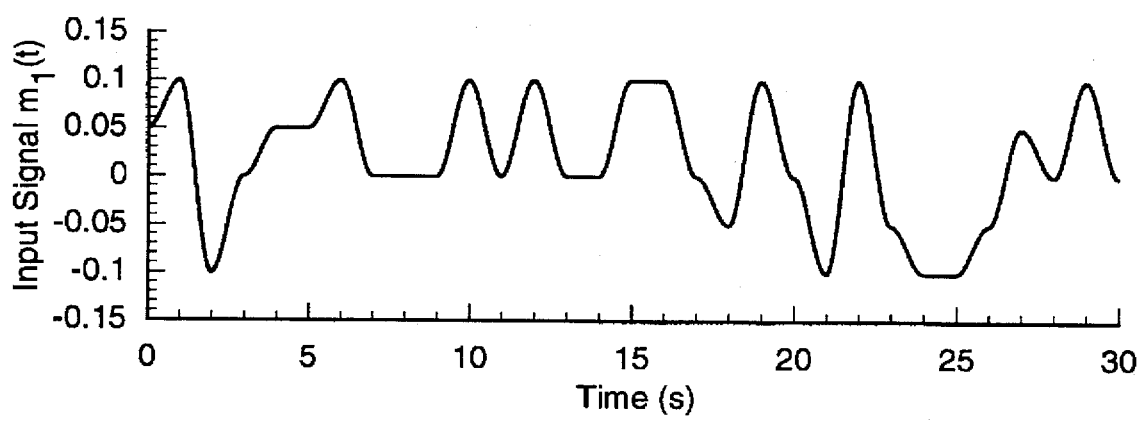
FIG. 1a is a graph of encoder input signal $m_1(t)$ versus time, in accordance with Example 1 of the present invention.
Figure 1B:
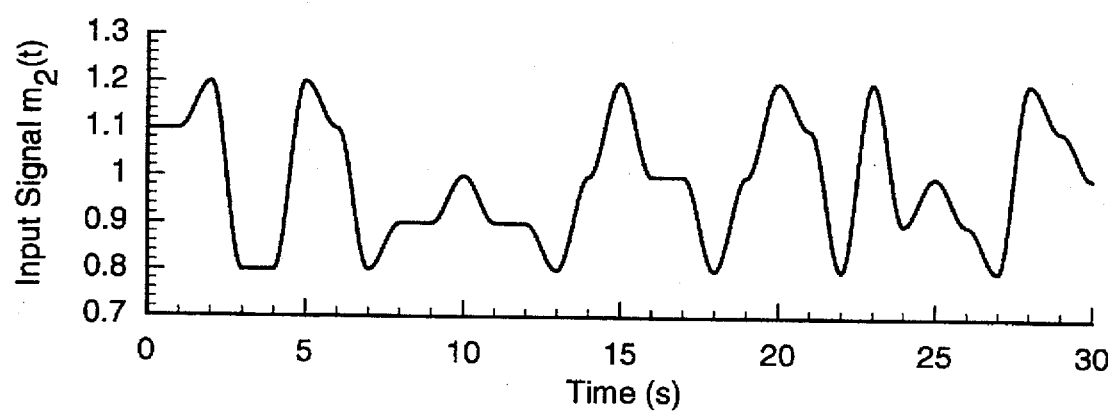
FIG. 1b is a graph of encoder input signal $m_2(t)$ versus time, in accordance with Example 1 of the present invention.
Figure 1C:
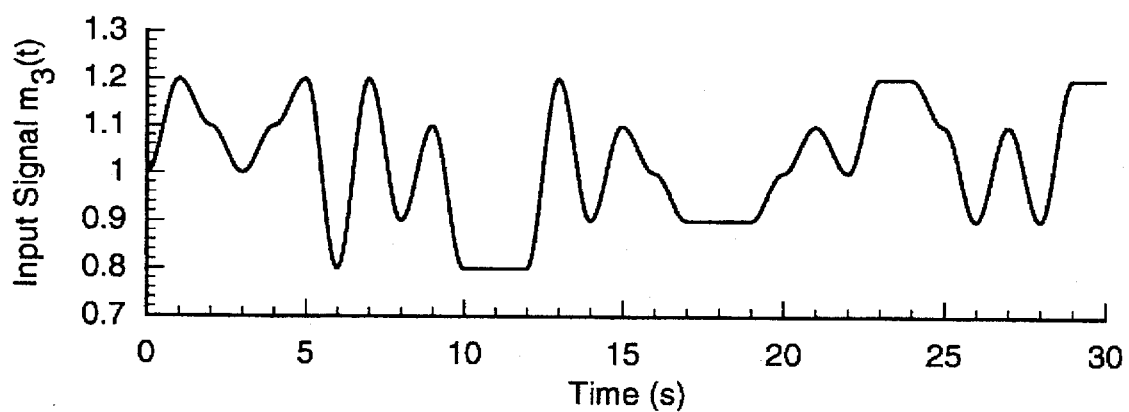
FIG. 1c is a graph of encoder input signal $m_3(t)$ versus time, in accordance with Example 1 of the present invention.
Figure 1D:
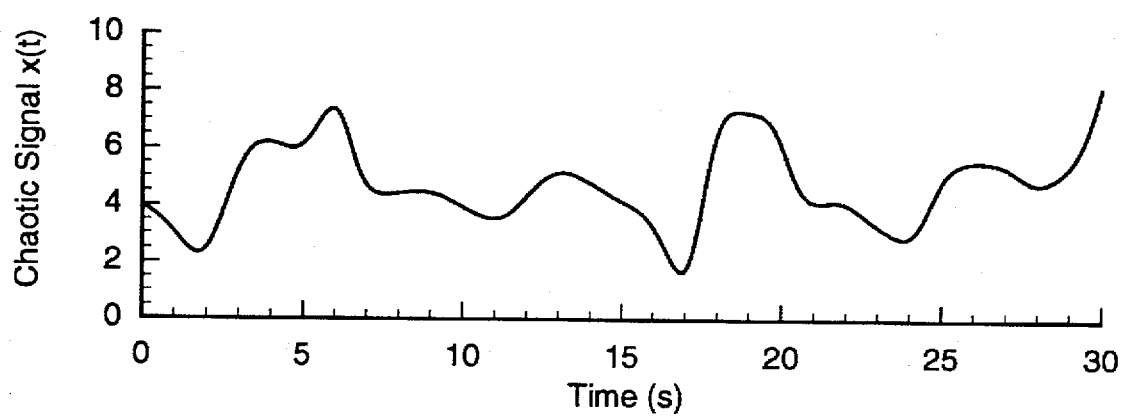
FIG. 1d is a graph of encoded, chaotic signal x(t), a component of $S_k(t)$, versus time, in accordance with Example 1 of the present invention.
Figure 1E:
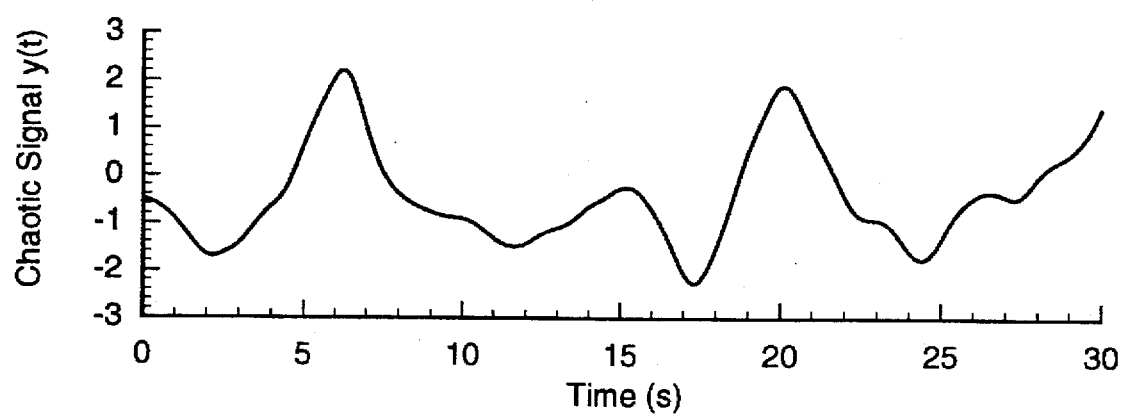
FIG. 1e is a graph of encoded, chaotic signal y(t), a component of $S_k(t)$, versus time, in accordance with Example 1 of the present invention.
Figure 1F:
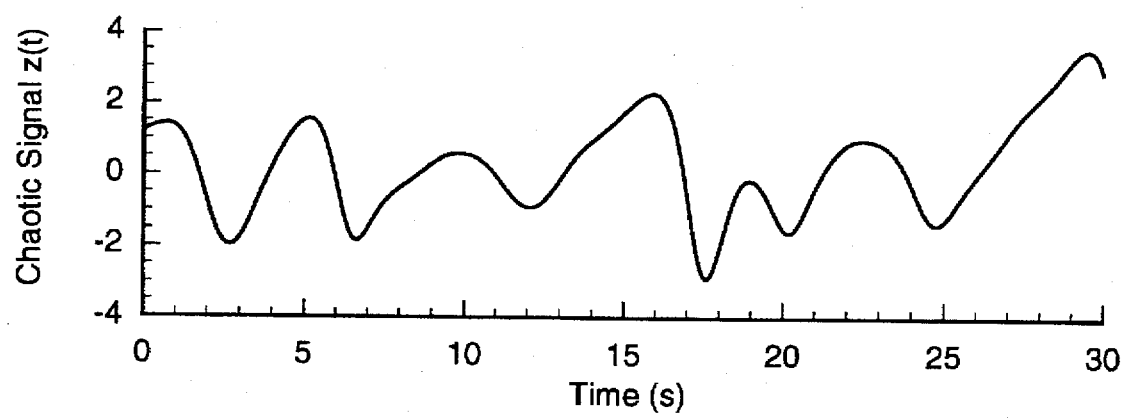
FIG. 1f is a graph of encoded, chaotic signal z(t), a component of $S_k(t)$, versus time, in accordance with Example 1 of the present invention.
Figure 1G:
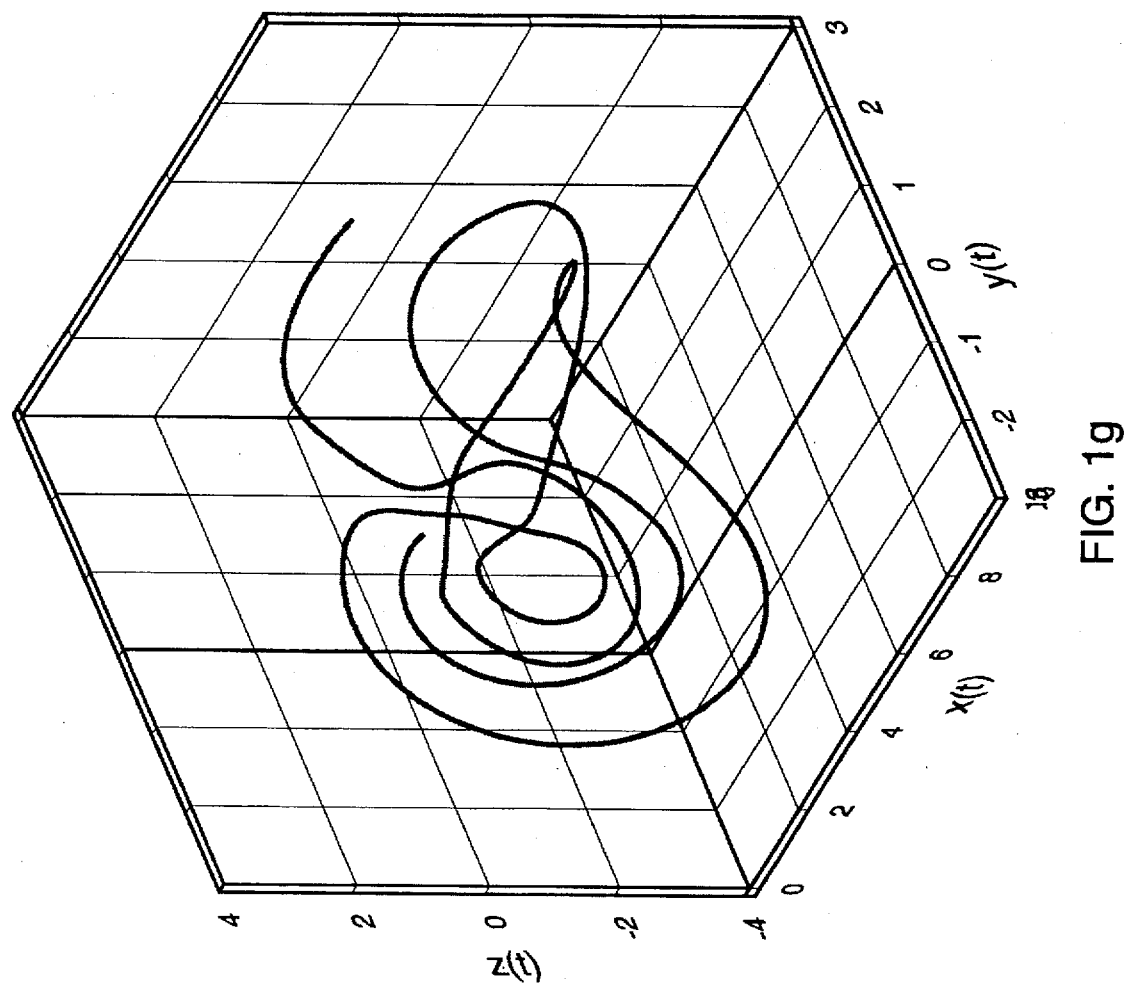
FIG. 1g is a graph of a three-dimensional state vector trajectory in the x-y-z plane and comprised of its state vector components x(t), y(t), and z(t), in accordance with Example 1 of the present invention.
Figure 1H:
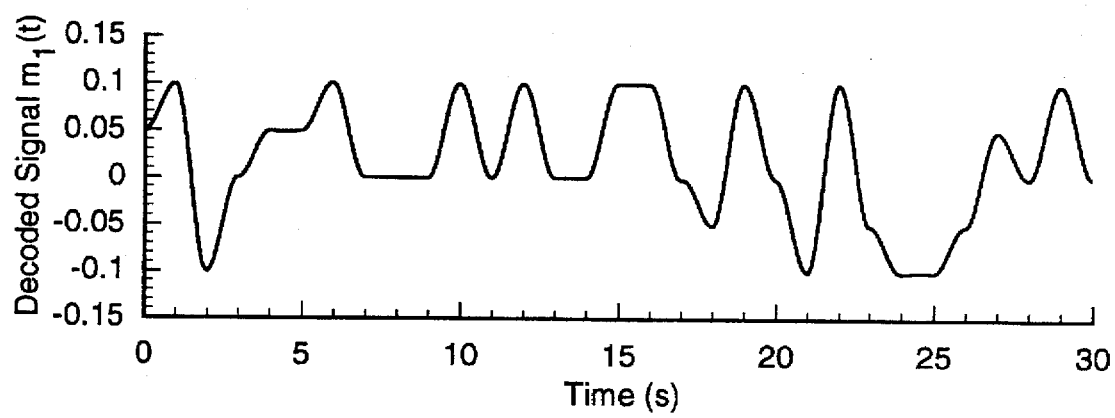
FIG. 1h is a graph of decoded, encoder input signal $m_1(t)$ versus time, in accordance with Example 1 of the present invention.
Figure 1I:
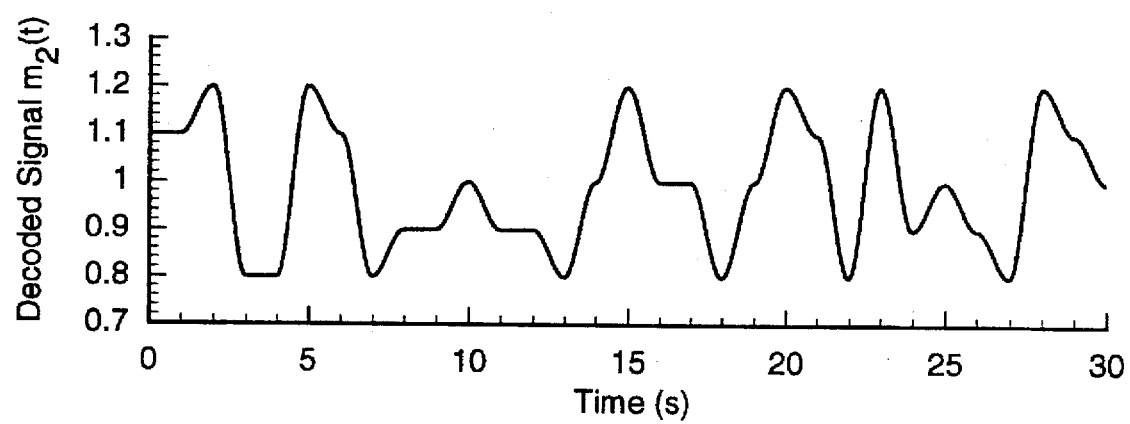
FIG. 1i is a graph of decoded, encoder input signal $m_2(t)$ versus time, in accordance with Example 1 of the present invention.
Figure 1J:
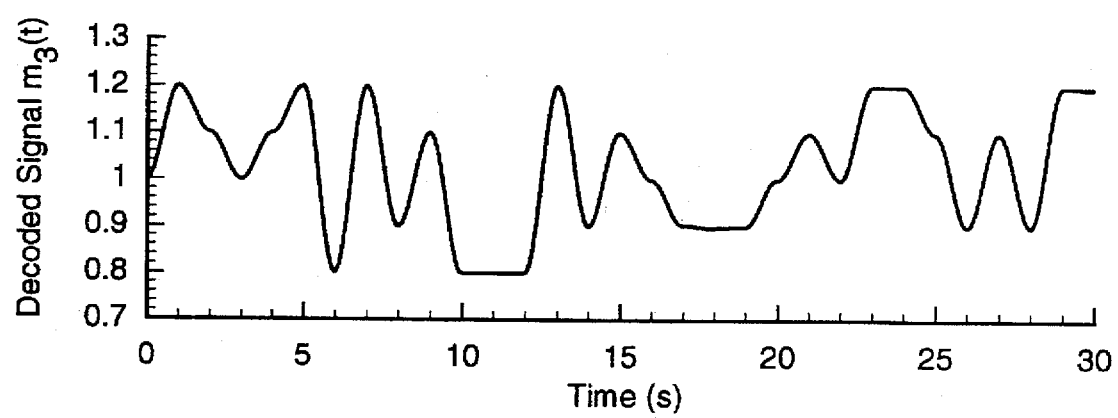
FIG. 1j is a graph of decoded, encoder input signal $m_3(t)$ versus time, in accordance with Example 1 of the present invention.

In Example 1, the input signal $m_1(t)$ fluctuated continuously near 0 (zero) while $m_2(t)$ and $m_3(t)$ fluctuated continuously near the value 1 (one) as shown in FIGS. 1a, 1b, and 1c, respectively. The values of the system parameters $P_j(t)$ (the "key") were selected to be $P_1=(+1)$, $P_2=(-1)$, $P_3=(+1)$, $P_4=(-1)$, $P_5=(-5)$, $P_6=(-1)$, $P_7=(+5)$, and $P_8=(+1)$. The input signals were stored in arrays for processing during the encoding process. Equations (1)–(3) were numerically integrated to encode the input signals using the 4th order Runge-Kutta method. The resulting chaotic signals $x(t)$, $y(t)$, and $z(t)$ comprised the three original input signals $m_1(t)$, $m_2(t)$, and $m_3(t)$ convoluted within them as shown in FIGS. 1d, 1e, and 1f, respectively. The three chaotic, state vector components $x(t)$, $y(t)$, and $z(t)$ combine to form a three-dimensional state vector trajectory as shown in FIG. 1g, which contains the input signals $m_1(t)$, $m_2(t)$, and $m_3(t)$ encoded within the trajectory. The chaotic signals $x(t)$, $y(t)$, and $z(t)$ comprised the output signals of the chaotic encoding system and were transmitted to a signal decoder (121) using conventional transmission techniques. The decoder (121) reconstructed the original input signals $m_1(t)$, $m_2(t)$, and $m_3(t)$ as shown in FIGS. 1h, 1i, and 1j respectively, by inverting the dynamics of the encoder (111) when solving the equations Eqs. (4)–(6) for the input signals $m_i(t)$.

Referring to FIGS. 2–5, there is shown an electric, analog circuit implementation of the preferred embodiment. The encoding/decoding system remains defined by Eqs. (1)–(6) and produce the equivalent signals as shown in FIGS. 1a–1g. The physical, analog circuit embodiment of FIGS. 2–5 performs the equivalent function of integrating a coupled set of nonlinear differential equations to encode information streams. The system parameters $P_j(t)$ in this implementation are comprised of the values of physical circuit parameters such as resistance, capacitance, and voltage. In other embodiments, the system parameters may be comprised of other quantities such as inductance, temperature, light intensity, etc. Also, a signal generator could be added to the circuit design to further convolute the input signals to be encoded, in addition to the generator or other means that provides the original input signals to the encoder.

Figure 2:
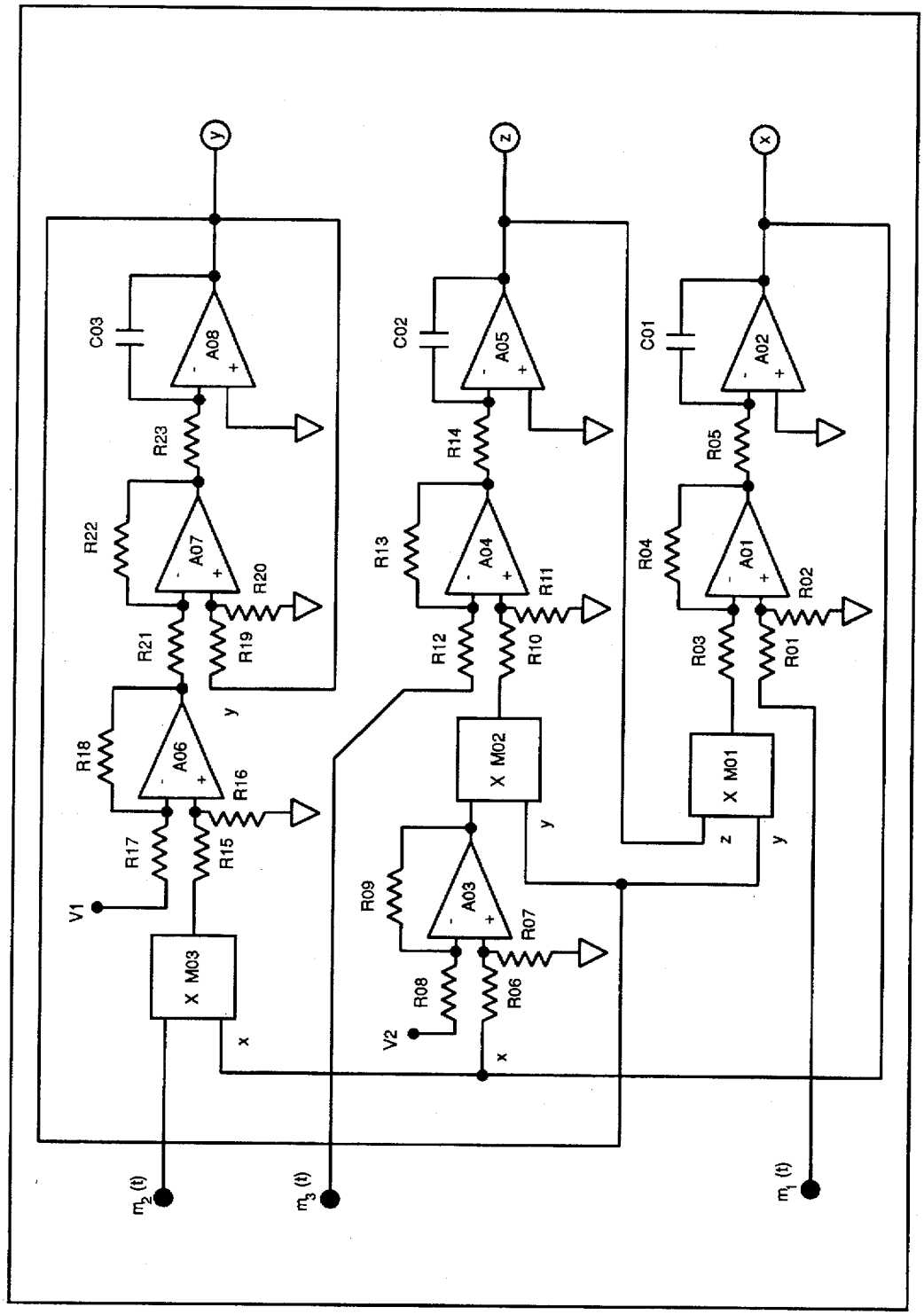
FIG. 2 is an electric circuit diagram of an encoding system for input signals $m_1(t)$, $m_2(t)$, and $m_3(t)$ in accordance with the present invention.

Referring to FIG. 2, the electrical circuit comprising the chaotic encoder (200) is comprised of operational amplifiers A01-A08, multipliers M01-M03, resistors R01-R23, and capacitors C01-C03. Constant input voltages $V_1$ and $V_2$ are shown in FIG. 2; constant input voltage $V_3$ is shown in FIG. 4; and constant input voltage $V_4$ is shown in FIG. 5. In a preferred embodiment, the constant input voltages are $V_1=+5v$, $V_2=+5v$, $V_3=-5v$, and $V_4=+5v$. The amplifiers are conventional type LF353 operational amplifiers; the multipliers are conventional type AD632 multipliers; resistors R01-R04, R06-R13, and R15-R22 are each 100 k-ohm, 0.1% precision resistors; R05, R14, and R23 are each 750 k-ohm, 0.1% precision resistors; and capacitors C01-C03 are each 500 picofarad, 1% precision capacitors. The input signal $m_1(t)$ fluctuates continuously near 0 (zero) while $m_2(t)$ and $m_3(t)$ fluctuate continuously near the value 1 (one) (as shown in FIGS. 1a, 1b, and 1c, respectively). The output signals $x(t)$, $y(t)$, and $z(t)$ contain convoluted within them the three input signals $m_1(t)$, $m_2(t)$, and $m_3(t)$. The decoding circuits (300), (400), and (500), shown in FIGS. 3-5 respectively, directly convert the encoder output signals $x(t)$, $y(t)$, and $z(t)$ to the original input signals $m_1(t)$, $m_2(t)$, and $m_3(t)$, respectively. In a preferred embodiment, the decoding circuits (300), (400), and (500) are comprised of operational amplifiers A09-A17, multipliers M04 and M05, divider D01, resistors R24-R48, and capacitors C04-C06. The amplifiers are conventional type LF353 operational amplifiers; the multipliers are conventional type AD632 multipliers; the divider D01 is comprised of conventional AD632 multiplier configured in a divide mode; resistors R24, R35, and R44 are each 750 k-ohm, 0.1% precision resistors; resistors R25-R30, R31-R34, R36, R38, R40-R43, and R45-58 are each 100 k-ohm, 0.1% precision resistors; resistor R37 and R39 are each 10 k-ohm, 0.1% precision resistors; and capacitors C04-C06 are each 500 picofarad, 1% precision capacitors. While specific component types and values have been used in the embodiment depicted in FIGS. 2-5, other component types and values could be suitably substituted by those of ordinary skill in the art.

Referring to FIG. 2, those skilled in the art of analog circuit design will recognize that the encoder circuit (200) performs the function of evaluating the coupled set of differential equations given by Eqs. (1)-(3). Operational amplifiers A01, A03, A04, A06, and A07 perform the functions of adding, subtracting, and scaling voltages, with resistors R01-R04, R06-R13, and R15-R22 setting the scaling factors. Multipliers M01-M03 perform the function of multiplying voltages. Operational amplifiers A02, A05, and A08 perform the function of integrating voltages with respect to time, with resistors R05, R14, and R23, and capacitors C01, C02, and C03 determining the time constants $\tau$ associated with the integration.

Figure 3:
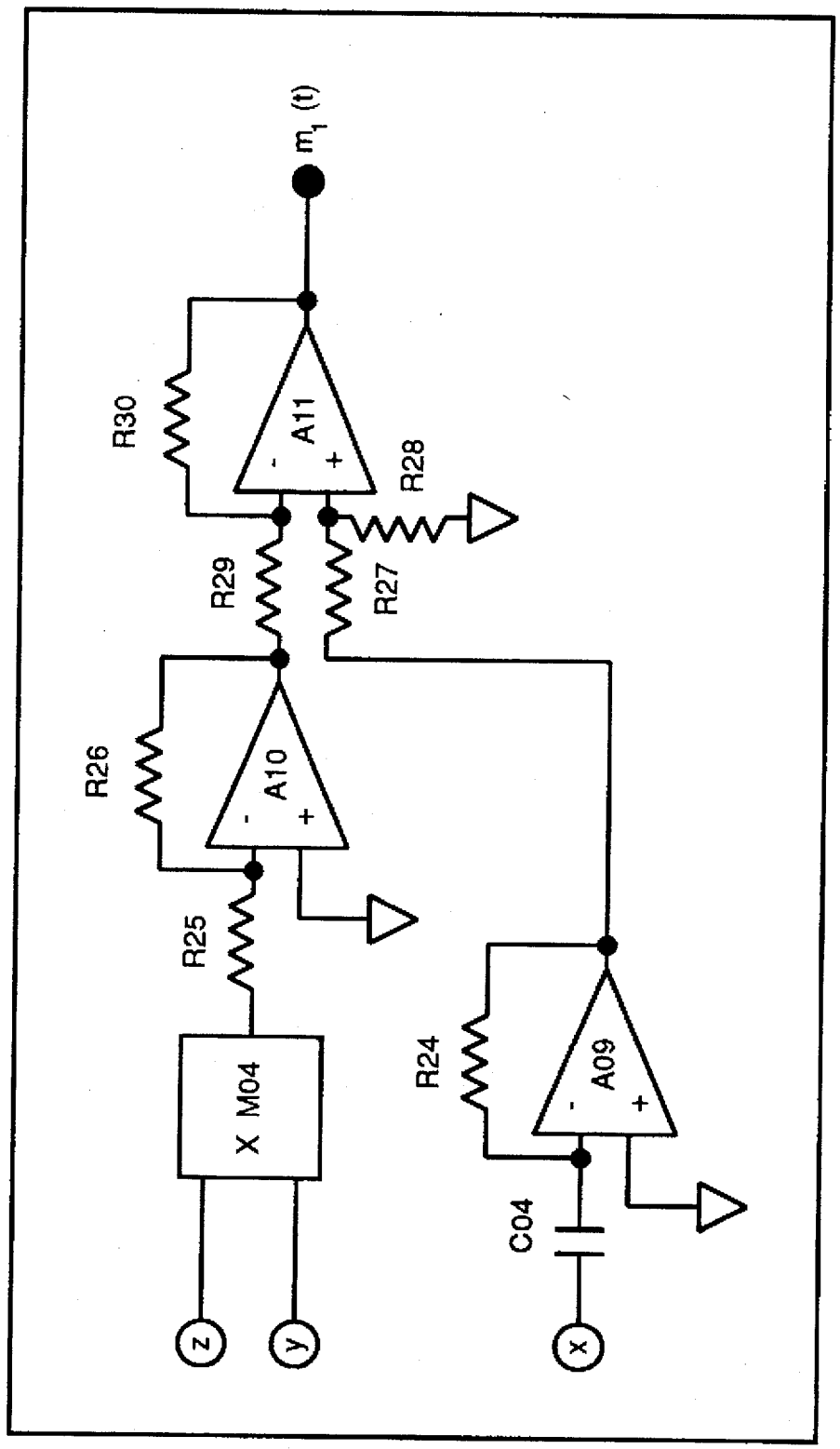
FIG. 3 is an electric circuit diagram of a decoding system for input signal $m_1(t)$, in accordance with the present invention.
Figure 4:
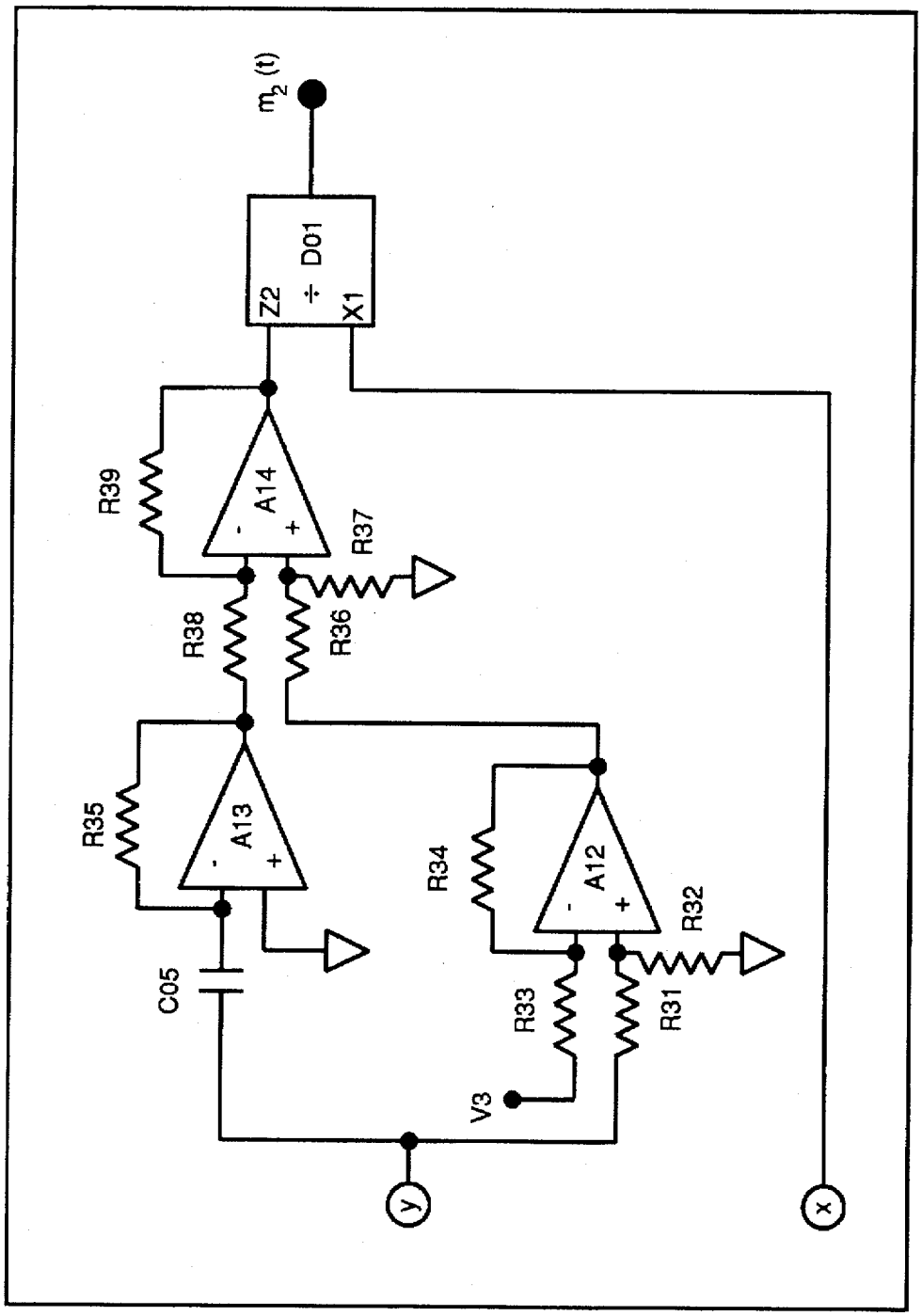
FIG. 4 is an electric circuit diagram of a decoding system for input signal $m_2(t)$, in accordance with the present invention.
Figure 5:
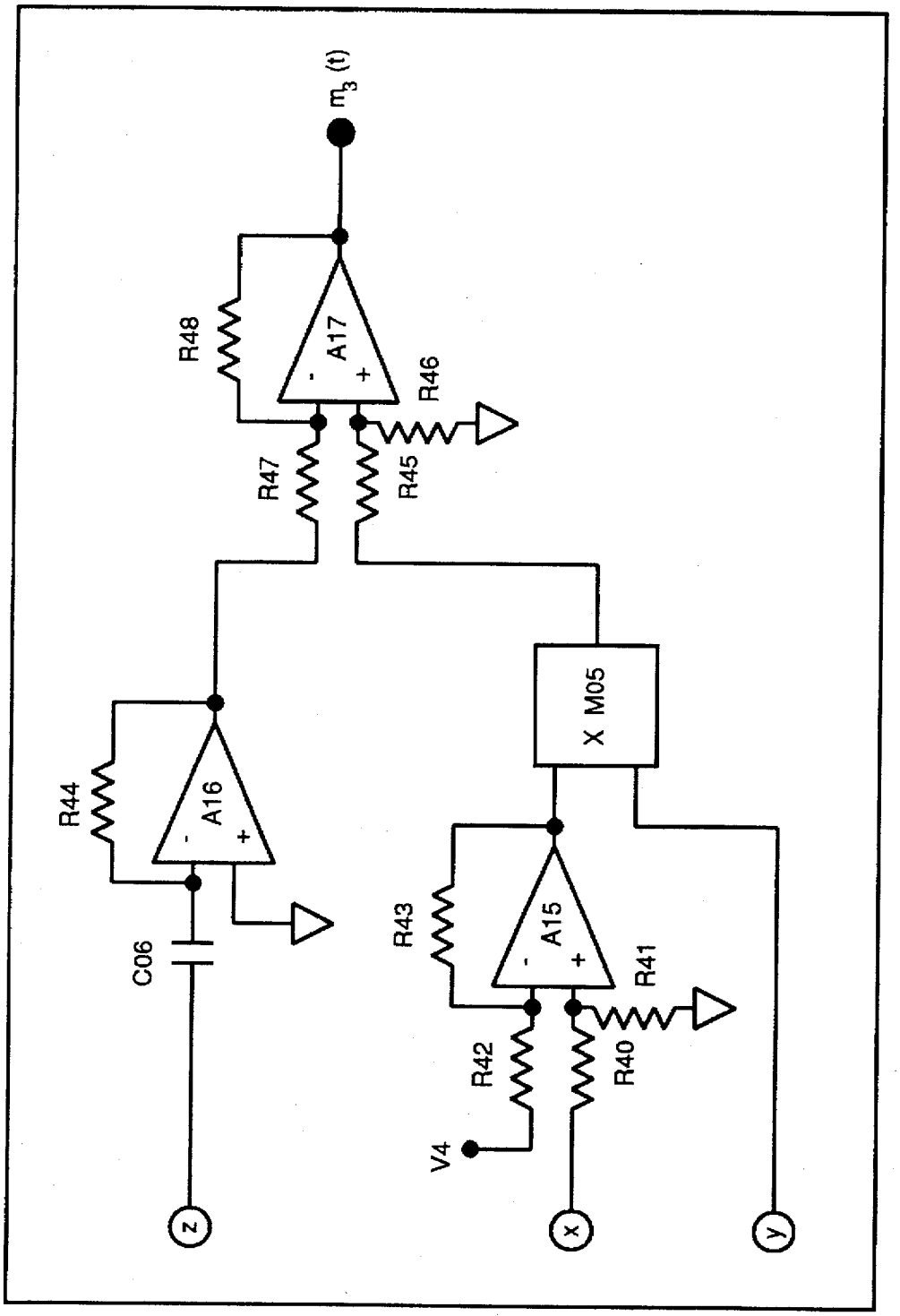
FIG. 5 is an electric circuit diagram of a decoding system for input signal $m_3(t)$, in accordance with the present invention.

Referring to FIGS. 3-5, the decoding circuits (300), (400), and (500) perform the function of evaluating Eqs. (4), (5), and (6), respectively. Operational amplifiers A10, A11, A12, A14, A15, and A17 perform the functions of adding, subtracting, and scaling voltages, with resistors R25-R34, R36-R39, R40-R43, and R45-R48 setting the scaling factors. Multipliers M04 and M05 perform the function of multiplying voltages. Divider D01 performs the function of dividing voltages. Operational amplifiers A09, A13 and A16 perform the function of differentiating voltages with respect to time, with resistors R24, R35, R44 and capacitors C04, C05, and C06 determining the time constants $\tau$ associated with the differentiation.

To illustrate the quantitative relationship between the physical circuit parameters described above and Eqs. (1)-(6), consider specifically Eqs. 3 and 6. For the special case where R06=R08, R07=R09, R10=R12, and R11=R13, and defining the time constant $\tau$ by $\tau=(R14)(C02)$, the coefficients $P_6$, $P_7$, and $P_8$ of Eq. 3 are determined by:

$$P_6 = \left(-\frac{1}{\tau}\right)\left(\frac{R11}{R10}\right)\left(\frac{R07}{R06}\right); \qquad (9)$$

$$P_7 = \left(-\frac{1}{\tau}\right)\left(\frac{R11}{R10}\right)\left(\frac{R07}{R06}\right)V_2;$$

$$P_8 = \left(-\frac{1}{\tau}\right)\left(\frac{R11}{R10}\right).$$

For the special case where R40=R42, R41=R43, R45=R47, and R46=R48, and defining the term $\tau$ by $\tau=(R44)(C06)$, the coefficients $P_6$, $P_7$, and $P_8$ of Eq. (6) are determined by:

$$P_6 = \left(-\frac{1}{\tau}\right)\left(\frac{R41}{R40}\right); \qquad (10)$$

$$P_7 = \left(-\frac{1}{\tau}\right)\left(\frac{R41}{R40}\right)(V_4);$$

$$P_8 = \left(-\frac{1}{\tau}\right)\left(\frac{R45}{R46}\right).$$

Still referring to FIGS. 2-5, in order for the decoding circuit (500) to properly decode signal $m_3(t)$ from the chaotic signals $x(t)$, $y(t)$, and $z(t)$ produced by the encoder (200), the values of the components and voltages $V_2$ and $V_4$ of the encoder (200) and decoding circuits (500) must be selected to provide the same numerical values of parameters $P_6$, $P_7$, and $P_8$ in the encoding and decoding circuits, where $P_6$, $P_7$, and $P_8$ are given by Eqs. (9) and (10). Similar equations relate parameters $P_1-P_5$ of Eqs. (1), (2), (4), and (5) to circuit parameters and voltages in FIGS. 2-5. The same rationale presented in this paragraph is true for $m_1(t)$ and $m_2(t)$ and the definitional equations in which they appear.

It is noted that the encoding circuit (200) of the embodiment depicted in FIG. 2 is distinctly different than that taught by Cuomo et al. in FIG. 1 of *Communication Using Synchronized Chaotic Systems*, U.S. Pat. No. 5,291,555. The distinct differences between the invention described in the Cuomo et al. patent and the present invention is twofold: (a) decoding is performed according to the present invention by direct evaluation of the inverted dynamics of the encoding system, and not by synchronization (the decoder of the invention described in U.S. Pat. No. 5,291,555 specifically requires synchronization to perform decoding); and (b) encoding is performed according to the present invention using a chaotic encoding system that has no constraint regarding the ability to synchronize with subsystems of the encoding system (the invention described in U.S. Pat. No. 5,291,555 specifically requires the chaotic encoder to have a stable subsystem that permits synchronization). The fundamental principle on which the present invention is based, direct inversion of the chaotic system dynamics, does not involve synchronization, and hence permits great flexibility in selecting systems suitable for embodiments.

While the coupled set of Eqs. (1)–(3) has been selected in preferred embodiments, both to define the chaotic system comprising the encoder and from which to derive the decoding equations, it is possible to implement a signal encoder/decoder system using other sets of equations that define a chaotic system. Those skilled in the art may be aware that the Rössler equations [E. O. Rössler, *An Equation for Continuous Chaos*, Phys. Lett. A57, 397 (1976)], or other less or more complex sets of equations, can define a chaotic system. Sets of differential equations with a different number of variables or dimensions than are used in the preferred embodiments, and with one or more input signals, may be used to define a chaotic encoding/decoding system in accordance with the present invention. The encoding system may have Lyapunov exponents that are positive, negative, or zero. Differential equations, iterated function systems, or other physical or mathematical systems determined by those skilled in the art to exhibit chaos may be used to create a signal encoder/decoder system in accordance with the present invention. In the present invention, the decoding system(s) for a given encoding system(s) is obtained by inverting the dynamics of the encoding system(s). Specifically, decoding equations are obtained by solving the equations defining the chaotic system for the parameter(s), signal(s), time delay(s), or other appropriate quantities or elements modulated by the input signal(s), a process that may be performed by those of ordinary skill in the art.

While the equations defining the encoder/decoder system have been evaluated numerically using a digital implementation in one embodiment and evaluated using an electric circuit implementation in another embodiment, the equations may be evaluated using other means. For example, combinations of digital (software) and analog (hardware) methods, or other methods known and available to those skilled in the art, may be used to evaluate the equations defining the encoder/decoder system of the present invention.

Figure 6:
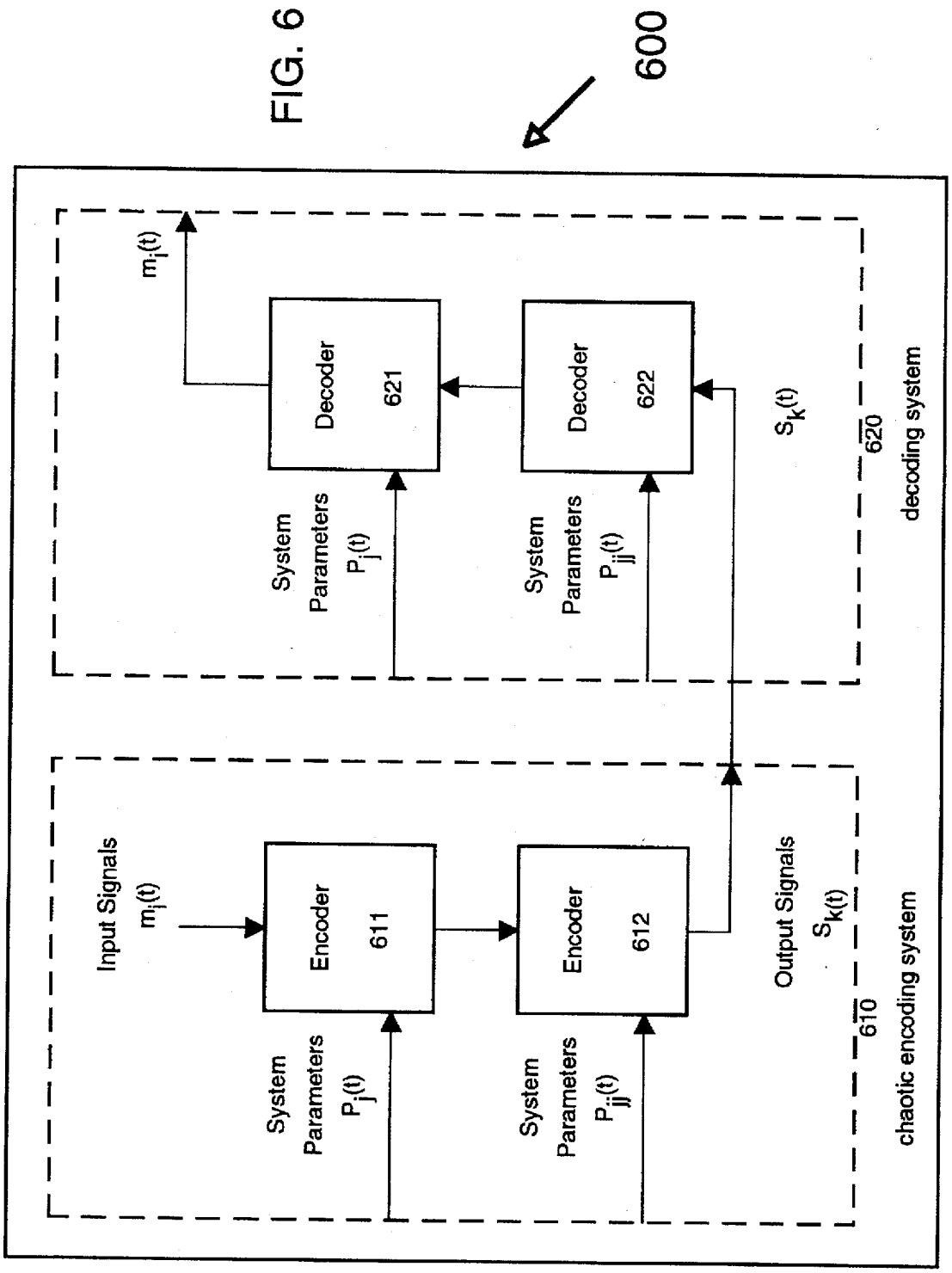
FIG. 6 is a block diagram of an information encoding/decoding system (600) comprising multiple, interconnected encoding and decoding systems, in accordance with the present invention.

Referring to FIG. 6, in an alternate embodiment (600) of the present invention, multiple encoding/decoding systems are coupled or interconnected together to perform the encoding (610) and decoding (620) processes and to further encrypt the information streams. Encoding/decoding system (600) enables more complex variations of the basic encoding/decoding systems (100) shown in FIG. 1. Input signals $m_i(t)$ to be encoded are provided to at least one encoder (611) at an encoder input port or equivalent means. The resulting encoder (611) output signals $m_{ji}(t)$ are provided as inputs to at least one additional encoder (612) from one encoder output port to another encoder input port. The resulting encoder (612) output signals $S_K(t)$, which are chaotic signals, are transmitted to the decoding system (620) and received at a decoder input port, which decodes the output signals to directly reconstruct the original input signals $m_i(t)$ at a decoder output port. Decoding may be performed in stages corresponding to the encoding stages, but in reverse order, i.e., the signals encoded by the last encoder (612) are the first to be decoded by decoder (622). The original input signals $m_i(t)$ are produced when the decoder (621) corresponding to the first encoder (611) completes its decoding process. It is noted that the schematic diagram of FIG. 6 illustrating this embodiment (600) comprises two coupled encoding/decoding systems (610) and (620) for the sake of clarity in introducing the embodiment (600) with the concept of coupled systems. Additional and more general implementations of coupled or interconnected encoding/decoding systems, i.e., multiple combinations of interconnected encoders and decoders, are possible and will become apparent to those of ordinary skill in the art. In addition, signal conditioning techniques known to those skilled in the art may be provided to convert signals to appropriate levels for the coupled components.

Figure 7:
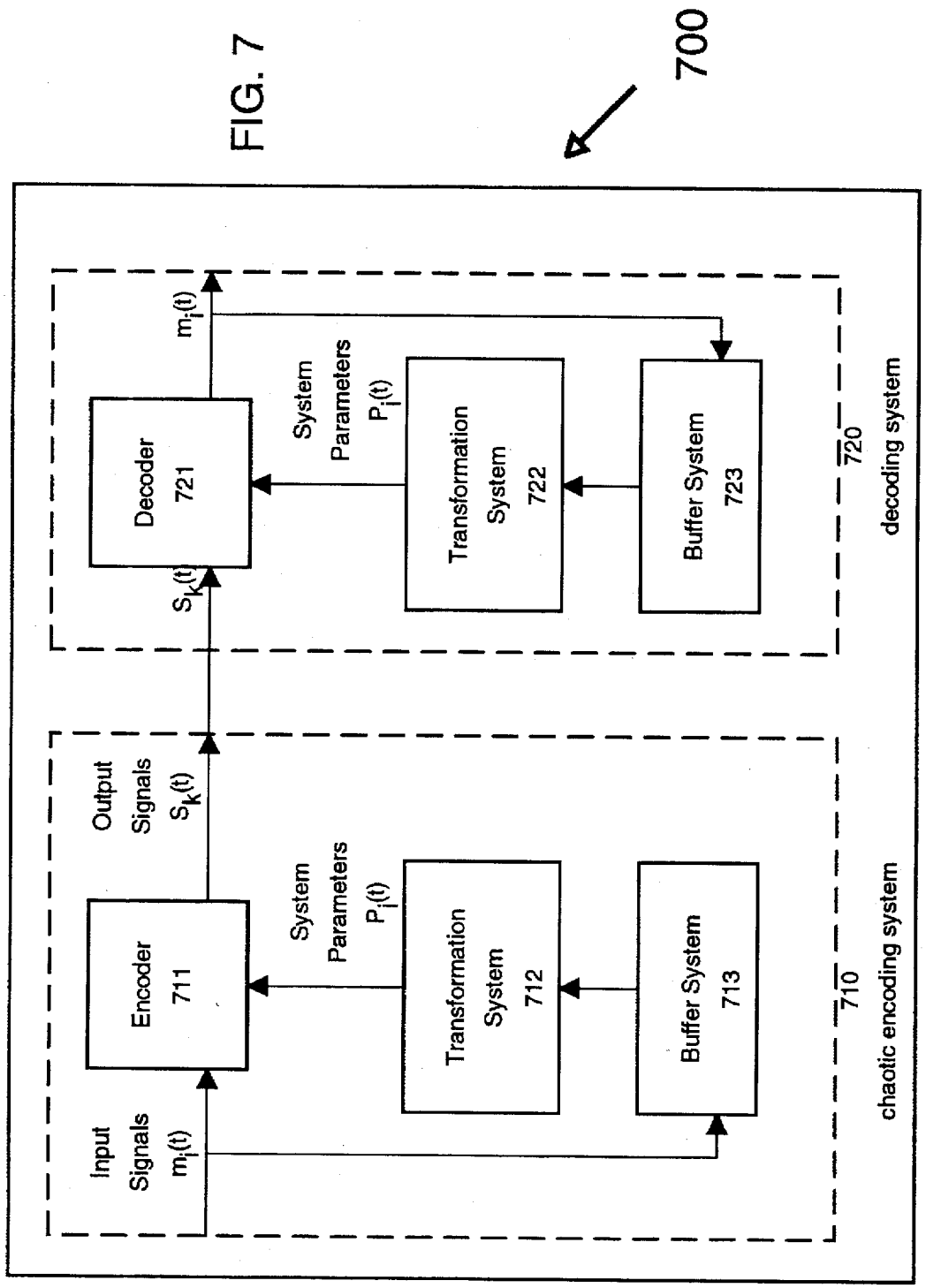
FIG. 7 is a block diagram of an information encoding/decoding system (700) comprising a cryptographic key system, in accordance with the present invention.

Referring to FIG. 7, in an alternate embodiment (700) of the present invention, one or more system parameters $P_j(t)$ may be directly coupled to one or more of the input signals $m_i(t)$ through a buffer system (713) and a transformation system (712). The buffer system (713) and the transformation system (712) may be replaced by other equivalent means so long as the encoder input signals impact systems parameters $P_j(t)$ in a convoluted manner; the function of the buffer-transformation system is to cause system parameters $P_j(t)$ to depend on an information stream (input signals) in a time-delayed fashion. In this embodiment, the encoding system (710) comprises at least one encoder (711), at least one buffer system (713), and at least one transformation system (712) arranged in a feedforward fashion as shown in FIG. 7; the decoding system comprises at least one decoder (721), at least one buffer system (723), and at least one transformation system (722) identical to those of the encoding system but arranged in a feedback fashion as shown in FIG. 7. As time elapses, input signal(s) $m_i(t)$ replace the contents of the buffer system (713), leaving the buffer system (713) containing the most recent portion of the input signal(s) $m_i(t)$. The function of the transformation system (712) and the buffer system (713) is to cause the values of the system parameters $P_j(t)$ to depend on the input signals $m_i(t)$ in a time-delayed fashion. As time elapses, changing input signal(s) $m_i(t)$ results in different contents of buffer system (713), which in turn changes the system parameters $P_j(t)$ via the transformation system (712), which in turn changes the dynamics of the encoder (711). Thus, the encoding process itself changes as a function of the information actually being encoded. The transformation system (712) transforms the contents of the buffer system (713) into system parameters $P_j(t)$ as illustrated in non-limiting Example 2 below. In effect, the transformation system (712) couples the system parameters to the input signals $m_i(t)$ in a time-delayed fashion. The (chaotic) encoder output signals $S_k(t)$ are capable of transmission to a decoder to be decoded by a decoding system (720) that comprises a buffer system (723) and a transformation system (722) that are identical to the buffer system (713) and transformation system (712) comprising the chaotic encoding system (710). The encoding system (710) continuously encodes the input signals while the transformation occurs.

To decode information from the chaotic signals, the same system parameters $P_j(t)$ used in the encoding system (710) must be provided to the decoding system (720) before the encoded signals are transmitted to the decoding system (720). To initiate the process of encoding and decoding input signal(s) $m_i(t)$, the input signals $m_i(t)$ that are placed in the buffer system (713) of the chaotic encoding system (710) are identical to the signals that are placed in the buffer system (723) of the decoding system (720) to act as a "common key." The original input signal(s) $m_i(t)$ that are placed in the buffer systems (713) and (723) act as cryptographic keys (i.e., the same signals must be present in the encoder's buffer system (713) and in the decoder's buffer system (723) to "unlock" the system to reconstruct the original input signals $m_i(t)$). The common key permits the encoded signals that are transmitted to be decoded up to the point in time that the buffer system (723) receives its first new stream of information. The decoder (721) provides its output signal as a feedback signal to the decoder buffer system, (723) until the original encoder input signal is reconstructed. The chaotic decoder (721) inverts the dynamics of the chaotic encoder (711) to reconstruct the original input signals. As the original input signal(s) $m_i(t)$ are reconstructed, the system parameters $P_j(t)$ of the decoder (721) change as information is transmitted or decoded in a way that permits the decoding of subsequent decoder input signal(s) $S_k(t)$; the decoding system parameters $P_j(t)$ change in a way that is determined by the decoder input signals $S_k(t)$. If the transmission of the chaotic, encoded signals $S_k(t)$ is interrupted, and the signals $m_i(t)$ change during the interruption, transmission is resumed by refilling buffer systems (713) and (723) with a common key. If the signals $m_i(t)$ do not change during such an interruption, transmission is resumed with no action required on the part of either the encoding or decoding systems. This is due to the fact that when the signals $m_i(t)$ are held constant in time, the buffer contents of buffer systems (713) and (723) do not change with time.

Other cryptographic key systems may be implemented with the signal encoder/decoder system (700), in accordance with the present invention, using techniques known and available to those skilled in the art. Other methods to implement buffer and transformation systems will become apparent to those skilled in the art, in accordance with the present invention. Other methods of modifying the system parameters during the encoding and decoding processes will also become apparent to those skilled in the art, in accordance with the present invention.

B. EXAMPLE 2

The particular values and configurations discussed in this non-limiting Example 2 can be varied and are cited merely to illustrate the particular embodiment illustrated in FIG. 7 operating in the chaotic regime, and are not intended to limit the scope of the invention. In the following Example 2, the present invention was implemented by a computer program embodied in a tangible medium, a computer's hard disk drive and subsequently loaded into the computer's random access memory and executed for processing by the computer's microprocessor. Any computer program storage device readable by a machine, tangibly embodying a program of instructions executable by the machine to perform the method steps for interactively receiving, encoding, transmitting, and decoding the input signals will suffice. The computer program code was intended to cause the computer to receive input signals, from a signal generator for instance, encode the signals in a chaotic manner, transmit the encoded signals to a decoder, and decode the encoded signals by inverting the dynamics of the encoding system. The encoder (711), a programmed computer, was comprised of a computer-based software implementation of Eqs. (1)–(3) above, and the decoder (721), also a programmed computer, was comprised of a computer-based software implementation of Eqs. (4)–(5) above.

Figure 7A:
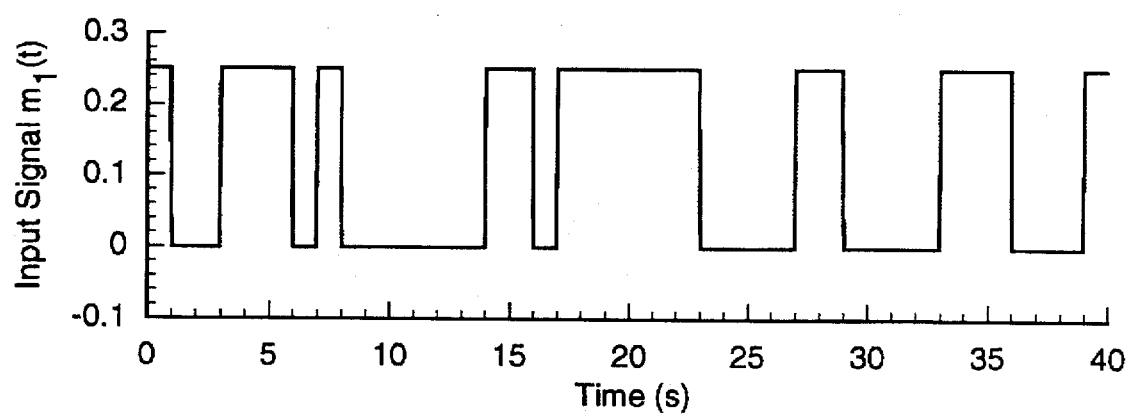
FIG. 7a is a graph of encoder input signal $m_1(t)$ versus time, in accordance with Example 2 of the present invention.
Figure 7B:
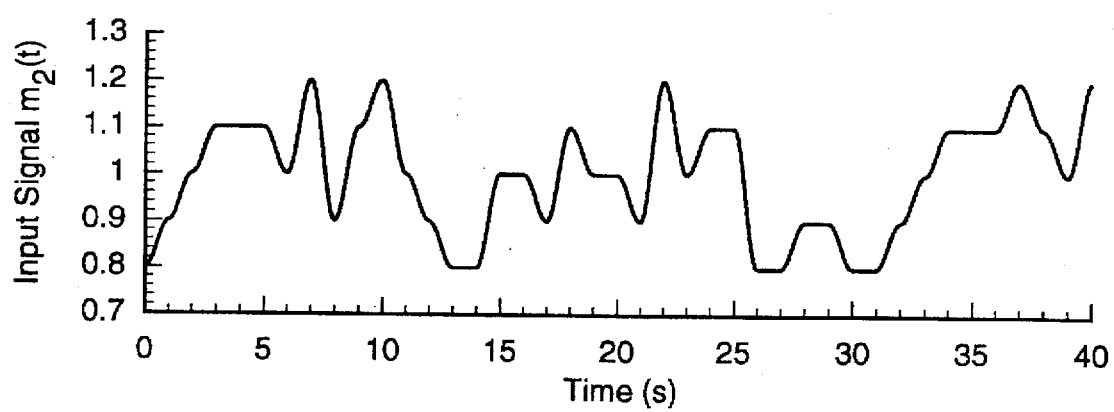
FIG. 7b is a graph of encoder input signal $m_2(t)$ versus time, in accordance with Example 2 of the present invention.
Figure 7C:
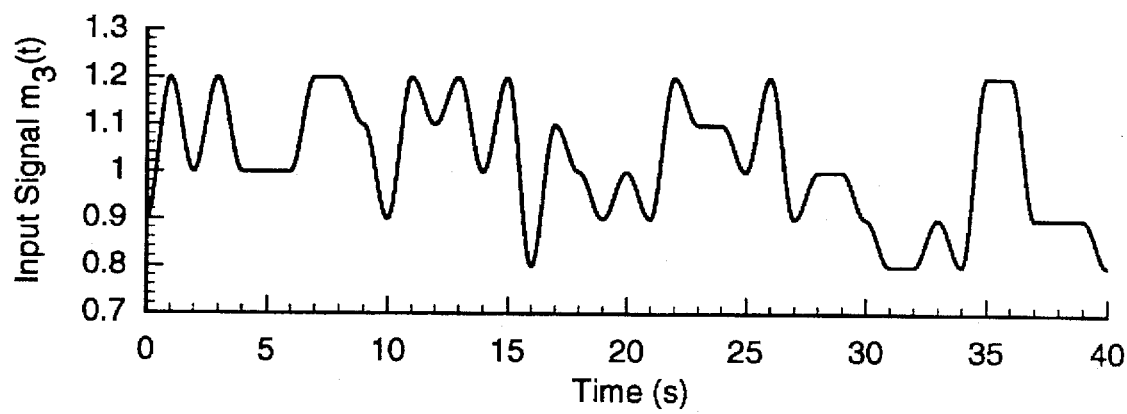
FIG. 7c is a graph of encoder input signal $m_3(t)$ versus time, in accordance with Example 2 of the present invention.
Figure 7D:
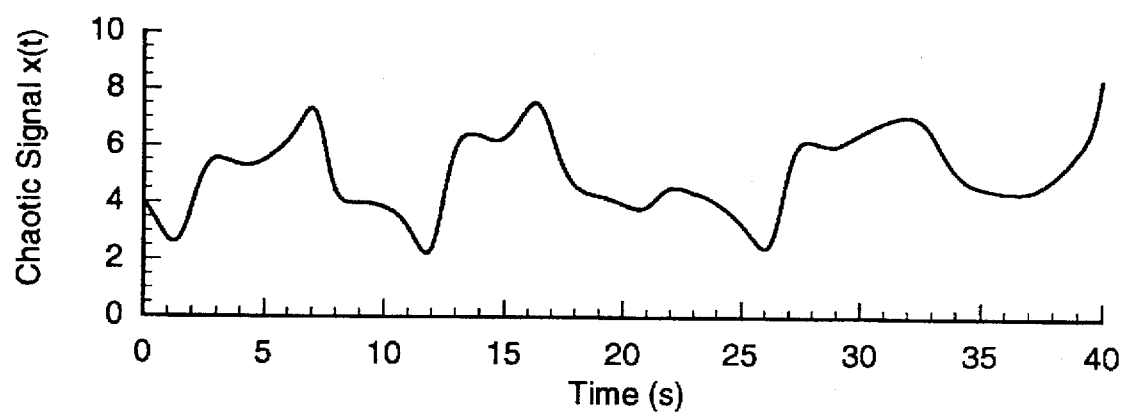
FIG. 7d is a graph of encoded, chaotic signal x(t) versus time, in accordance with Example 2 of the present invention.
Figure 7E:
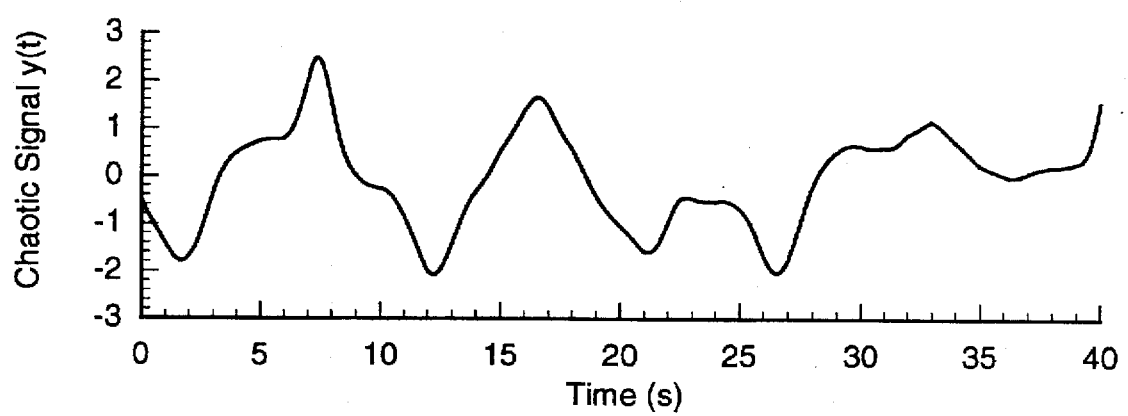
FIG. 7e is a graph of encoded, chaotic signal y(t) versus time, in accordance with Example 2 of the present invention.
Figure 7F:
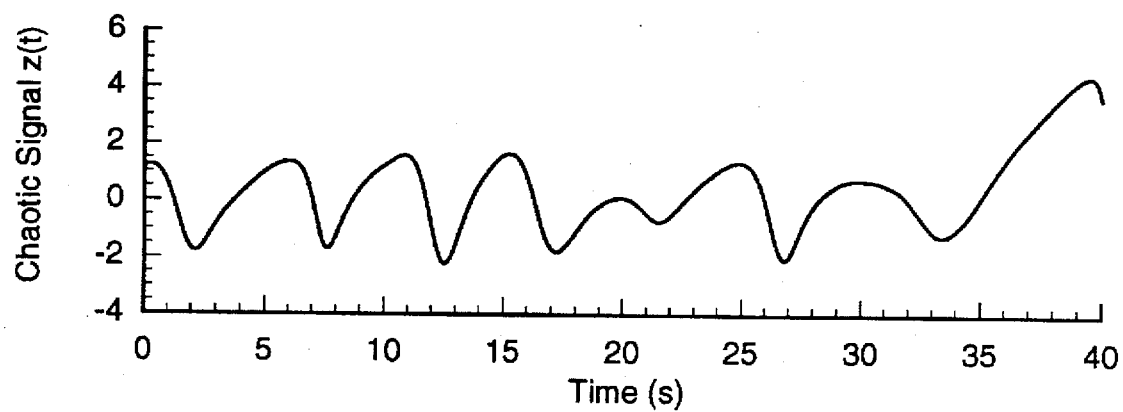
FIG. 7f is a graph of encoded, chaotic signal z(t) versus time, in accordance with Example 2 of the present invention.
Figure 7G:
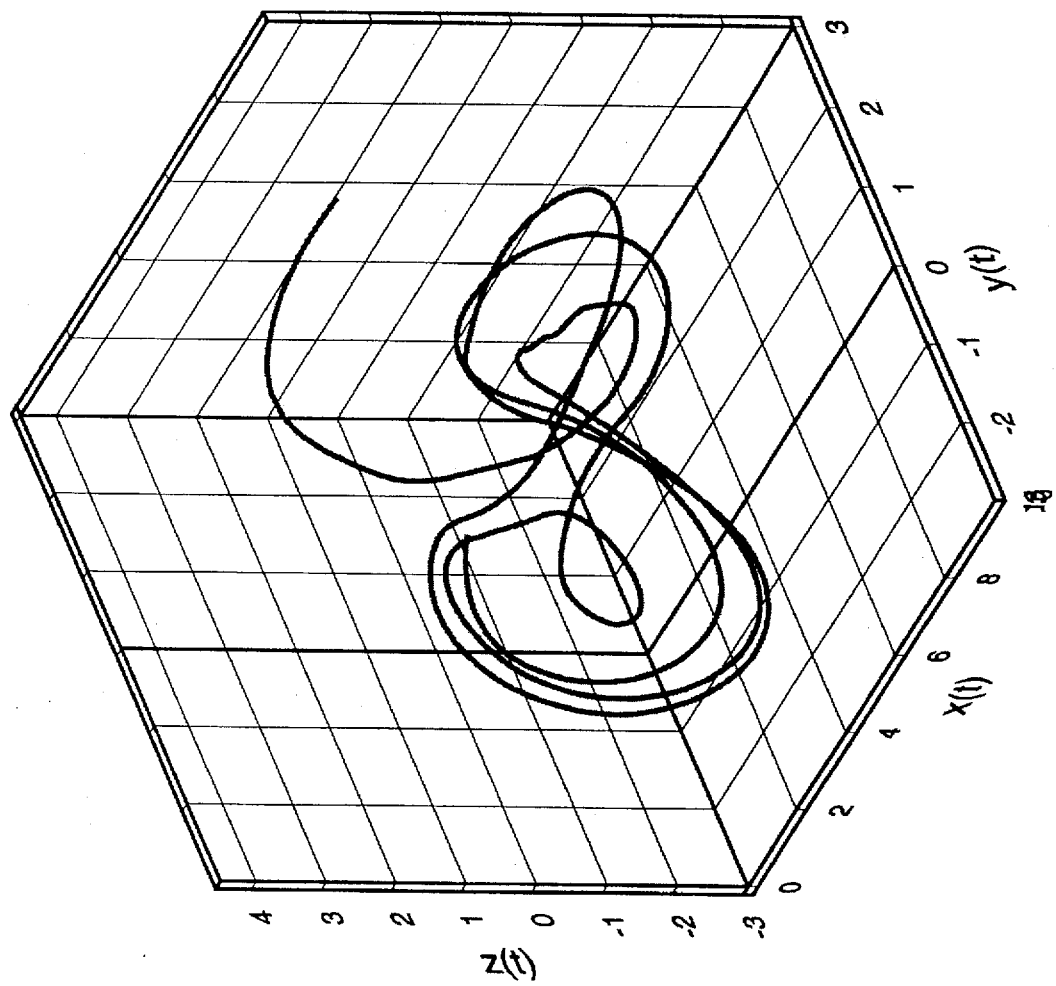
FIG. 7g is a graph of a three-dimensional state vector trajectory in the x-y-z plane and comprised of its state vector components x(t), y(t), and z(t), in accordance with Example 2 of the present invention.
Figure 7H:
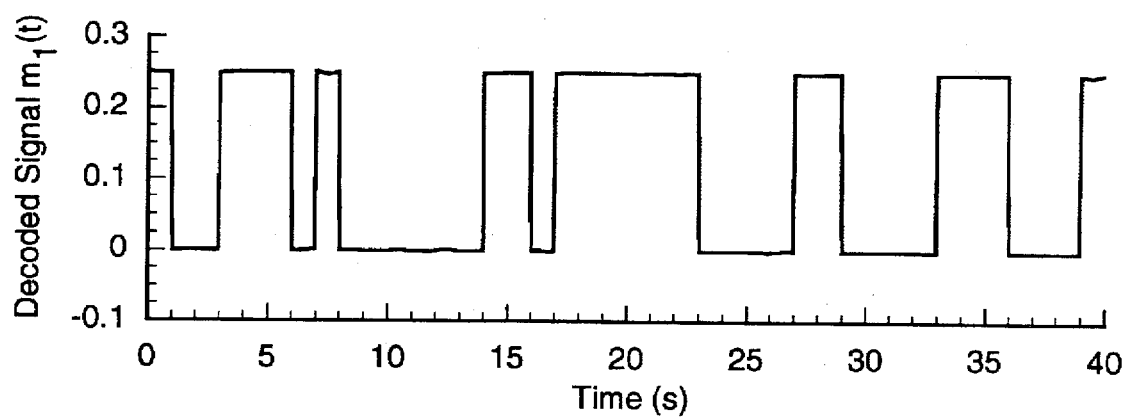
FIG. 7h is a graph of decoded, input signal $m_1(t)$ versus time, in accordance with Example 2 of the present invention.
Figure 7I:
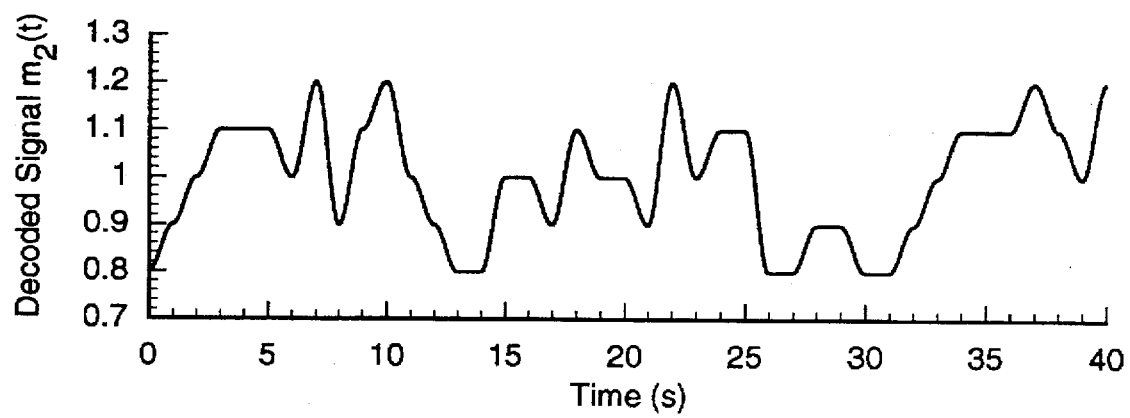
FIG. 7i is a graph of decoded, input signal $m_2(t)$ versus time, in accordance with Example 2 of the present invention.
Figure 7J:
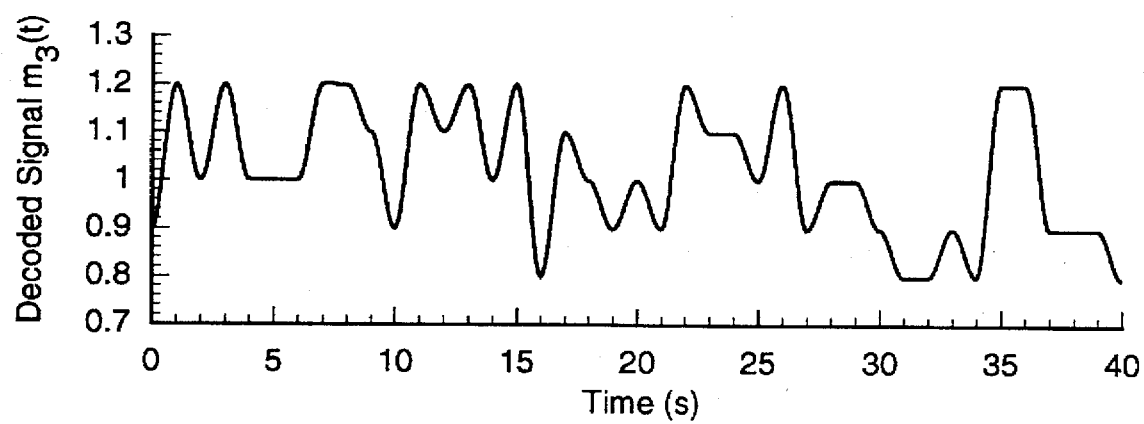
FIG. 7j is a graph of decoded, input signal $m_3(t)$ versus time, in accordance with Example 2 of the present invention.

In Example 2, the input signal $m_1(t)$ was a discrete signal and transitioned between the two distinct values of 0 (zero) and 0.25 as shown in FIG. 7a, with transitions being permitted precisely once each second. In practice, one of the input signals could be a discrete signal, although not necessary, in order to obtain precision during the decoding process. Whether or not a transition actually occurred at any given second was determined by a random number generator (not shown). The input signals $m_2(t)$ and $m_3(t)$ varied continuously between the values of 0.8 and 1.2 as shown in FIGS. 7b and 7c, respectively. As in Example 1, the values of the system parameters $P_j(t)$ (the "key") were selected to be $P_1=(+1)$, $P_2=(-1)$, $P_3=(+1)$, $P_4=(-1)$, $P_5$=variable, $P_6=(-1)$, $P_7=(+5)$, and $P_8=(+1)$. The function of the combined buffer system (713) and transformation system (712) was to modify the value of the parameter $P_5$ once each second in a way that depended on the random input signal $m_1(t)$. The modification of $P_5$ increased the level of complexity by which the encoder encoded the input signals $m_1(t)$, $m_2(t)$, and $m_3(t)$. The buffer system (713) was comprised of a first-in-first-out memory configuration that stored the value of $m_1(t)$ for each of the previous ten, one-second intervals. For example, during the time period between 20 and 29 seconds, the buffer system (713) comprised the following ten values of input signal $m_1(t)$: 0.25, 0.25, 0.25, 0, 0, 0, 0, 0.25, 0.25, and 0 (as shown in FIG. 7a). The transformation system (712) was comprised of an adder (not shown) that added the oldest four values contained in the buffer (e.g., when added, 0, 0.25, 0.25, 0 (as enumerated above) equal 0.5), and then added the result to a predetermined number (−5.5), which was also provided to the decoder, to produce a final result, which became the new value for the system parameter $P_5$. The value of $P_5$ for the encoding system (710) was thus updated once each second. For example, if the oldest four values of the buffer contents were 0, 0.25, 0.25, and 0, then $P_5$ would result in a new value of (−5.0). Equations (1)–(3) were numerically integrated to encode the input signals using the 4th order Runge-Kutta method. The resulting chaotic signals $x(t)$, $y(t)$, and $z(t)$ comprised the three original input signals $m_1(t)$, $m_2(t)$, and $m_3(t)$ convoluted within them as shown in FIGS. 7d, 7e, and 7f, respectively. The three chaotic, state vector components $x(t)$, $y(t)$, and $z(t)$ combine to form a three-dimensional state vector trajectory as shown in FIG. 7g. The buffer system (723) and transformation system (722) for the decoder were identical in function to that used for the encoder. The buffer system (713) for the encoder acted on the encoded signal $m_1(t)$, whereas the buffer system (723) for the decoder acted on the decoded signal $m_1(t)$. To initiate the encoding/ decoding process, the buffer system (713) for the encoding system (710) was randomly filled with the numbers 0 and/or 0.25; the buffer system (723) for the decoder was filled with the same numbers as were contained in the buffer system (713) for the encoding system. The encoding, transmitting, and decoding processes were then caused to start simultaneously thereby producing an encrypted signal to be transmitted and then directly decrypted by the decoder (721). The decoder (721) reconstructed the original input signals $m_1(t)$, $m_2(t)$, and $m_3(t)$ as shown in FIGS. 7h, 7i, and 7j, respectively, by inverting the dynamics of the encoder (711) when solving the equations (4)–(6) for the input signals $m_i(t)$.

While the chaotic systems used in the embodiments discussed above have been defined by equations containing known mathematical functions, a signal encoder/decoder system may be implemented in accordance with the present invention using a chaotic system whose underlying mathematical description is not known. One such system of unknowns can be expressed as:

$$\frac{dx(t)}{dt} = P_1 y(t) z(t) + P_2 m_1(t) + f_1(x,y,z) \qquad (11)$$

$$\frac{dy(t)}{dt} = P_3 x(t) m_2(t) + P_4 y(t) + P_5 + f_2(x,y,z) \qquad (12)$$

$$\frac{dz(t)}{dt} = P_6 x(t) y(t) + P_7 y(t) + P_8 m_3(t) + f_3(x,y,z) \qquad (13)$$

where the functions $f_1(x,y,z)$, $f_2(x,y,z)$, $f_3(x,y,z)$ are not explicitly known. The decoding equations are provided by solving Eqs. (11)–(13) for the input signals as follows:

$$m_1(t) = \frac{\frac{dx(t)}{dt} - P_1 y(t) z(t) - f_1(x,y,z)}{P_2} \quad (14)$$

$$m_2(t) = \frac{\frac{dy(t)}{dt} - P_4 y(t) - P_5 - f_2(x,y,z)}{P_3 x(t)} \quad (15)$$

$$m_3(t) = \frac{\frac{dz(t)}{dt} - P_6 x(t) y(t) - P_7 y(t) - f_3(x,y,z)}{P_8} \quad (16)$$

Those of ordinary skill in the art are aware that it is possible to define a fabrication or assembly procedure for, or otherwise specify, a physical system that exhibits chaos for which the explicit equations defining the behavior of the physical system may not be known. The corresponding decoding systems can be defined by inverting the specifications of the chaotic system to provide the parameter(s), signal(s), time delay(s), or other appropriate quantities modulated by the input signal(s), a process that may be performed by those skilled in the art.

In yet another embodiment of a signal encoder/decoder system, in accordance with the present invention, the encoder is comprised of iterated functions. Referring to FIG. 1 again, the encoder (111) produces chaotic signals $x_n$ and $y_n$ in accordance with coupled set of Eqs. (17) and (18) (shown collectively as $S_k(t)$ in FIG. 1) as presented below, where the varying input signal $m_n$ modifies the dynamics of the encoding system:

$$x_{n+1} = P_1 + P_2 x_n + P_3 x_n^2 m_n + P_4 x_n y_n + P_5 y_n + P_6 y_n^2 \quad (17)$$

$$y_{n+1} = P_7 + P_8 x_n + P_9 x_n^2 + P_{10} x_n y_n + P_{11} y_n + P_{12} y_n^2 \quad (18)$$

In this embodiment, input signals $m_n$ modify the dynamics of the encoding system (110). The values of $P_1$ through $P_{12}$ are preselected constants. The values of $x_n$ and $y_n$ are assigned initial values $x_1$ and $y_1$ in a range that causes the encoding/decoding system to operate in the chaotic regime in a manner well known to those of ordinary skill in the art, and, with the value of $m_1$ to be encoded, Eqs. (17) and (18) are evaluated. Successive values of $x_n$ and $y_n$ are determined by repeatedly iterating Eqs. (17) and (18). The iterations are such that the iterative values of $x_{n+1}$ and $y_{n+1}$ do not converge upon any one value, but instead result in new values that exhibit chaotic behavior in accordance with their underlying definitions. Each new value for $x_n$ and $y_n$ is substituted in the Eqs. (17) and (18), which are re-evaluated using the new values. The iterative process continues for the duration of the input signals, e.g., if the input signal consists of a stream of 1,000 numbers to be encoded, then Eqs. (17) and (18) are iterated 1,000 times.

C. EXAMPLE 3

Figure 8:
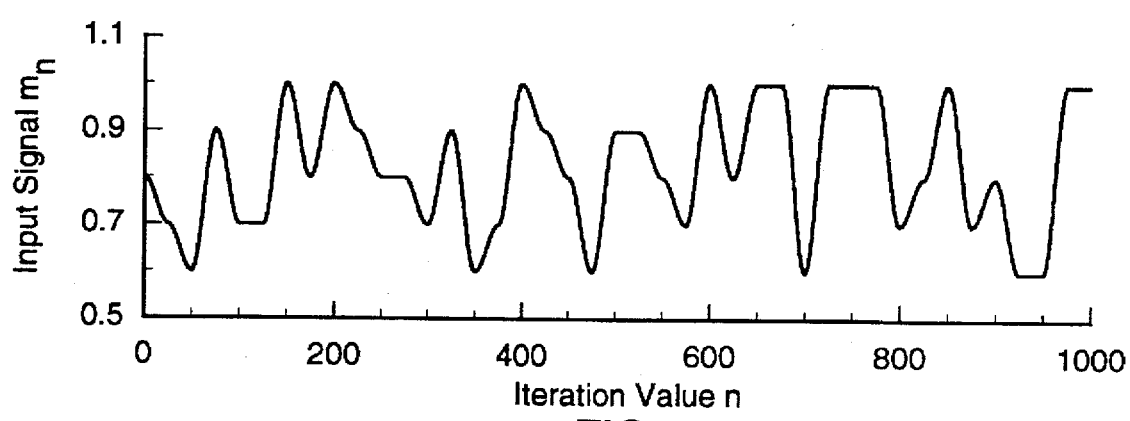
FIG. 8 is a graph of encoder input signal $m_n$ versus iteration value n, in accordance with Example 3 of the present invention.
Figure 9:
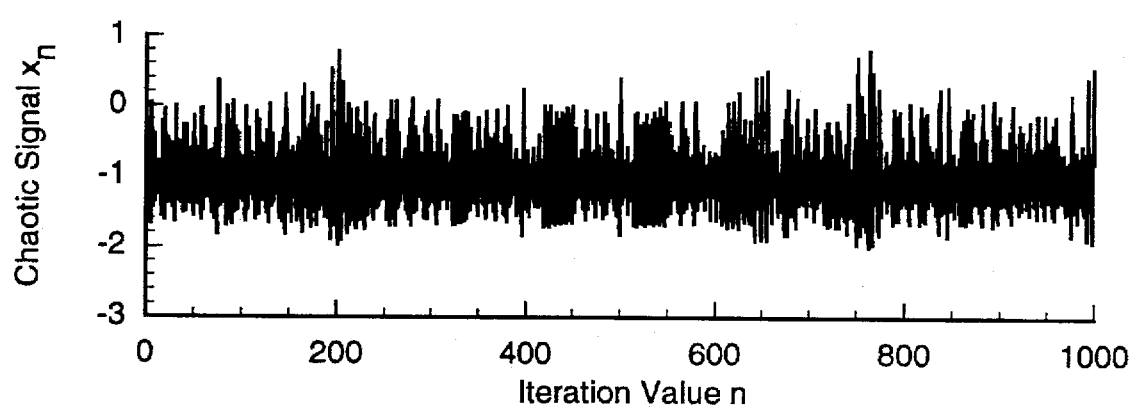
FIG. 9 is a graph of encoded, chaotic signal $x_n$ versus iteration value n, in accordance with Example 3 of the present invention.
Figure 10:
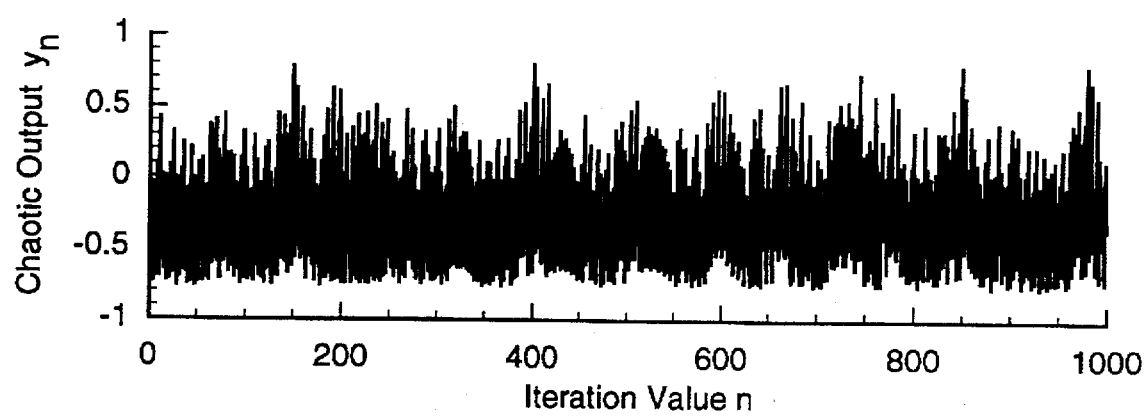
FIG. 10 is a graph of encoded, chaotic signal $y_n$ versus iteration value n, in accordance with Example 3 of the present invention.
Figure 11:
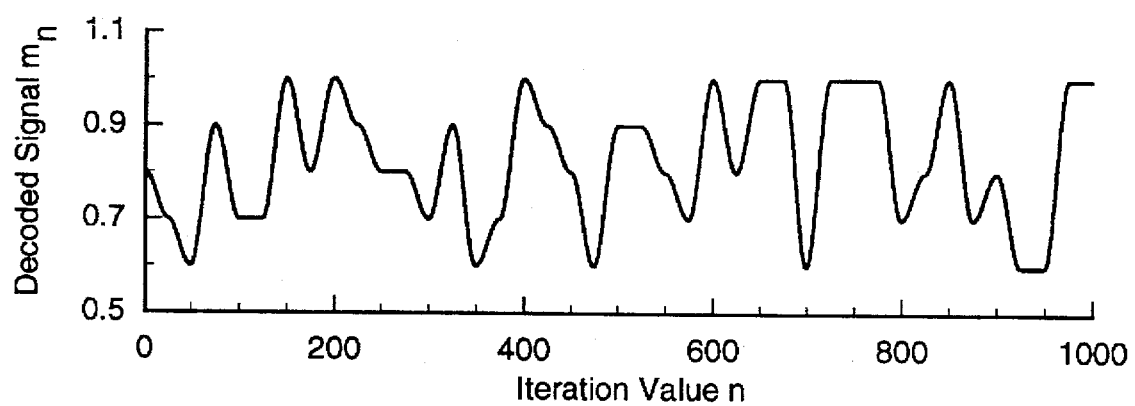
FIG. 11 is a graph of decoded, input signal $m_n$ versus iteration value n, in accordance with Example 3 of the present invention.

The particular values and configurations discussed in this Example 3 can be varied and are cited merely to illustrate a particular embodiment of the present invention and are not intended to limit the scope of the invention. In the following Example 3, the input signal $m_n$ fluctuated continuously between the value 0.6 and the value 1 as shown in FIG. 8. The values of the system parameters $P_j$ (the "keys") were selected to be $P_1=(-0.6)$, $P_2=(-0.4)$, $P_3=(-0.4)$, $P_4=(-0.8)$, $P_5=(0.7)$, $P_6=(0.3)$, $P_7=(-0.4)$, $P_8=(0.4)$, $P_9=(0.5)$, $P_{10}=(0.5)$, $P_{11}=(0.8)$, $P_{12}=(0.1)$. Those skilled in the art may recognize that Eqs. (17) and (18), with these values for $P_j(t)$ and with the special case of $m_n=1$, result in a two-dimensional quadratic map taught by J. C. Sprott. [J. C. Sprott, *Automatic Generation of Strange Attractors*, Comput. & Graphics 17, 325 (1993)] When Eqs. (17) and (18) were numerically iterated, the resulting sequence of numbers $x_n$ and $y_n$ contained convoluted within them the varying input signals $m_n$ as shown in FIGS. 9 and 10, respectively. The sequence of numbers $x_n$ and $y_n$ comprised the output signals of the chaotic encoding system, which were transmitted to the signal decoder. In this embodiment, the signal decoder (120) received the transmitted, chaotic signals $x_n$ and $y_n$ and directly reconstructed the original input signals $m_n$ as shown in FIG. 11. Specifically, the decoder (121) produced the original signals by inverting the dynamics of the encoder, in accordance with Eq. (19) as presented below:

$$m_n = \frac{x_{n+1} - P_1 - P_2 x_n - P_4 x_n y_n - P_5 y_n - P_6 y_n^2}{P_3 x_n^2} \quad (19)$$

The system parameters $P_j$ of the decoding system were comprised of the same values as those used by the encoding system to perform the encoding. Those skilled in the art are aware that it may be possible to implement a signal encoding/decoding system, in accordance with the present invention, using other iterated functions, or coupled sets of iterated functions. Variations in the embodiment of the present invention using iterated functions may be made similar to those described using nonlinear dynamical systems defined in terms of differential equations.

The encoding system described herein can be implemented by various methods including but not limited to: (a) constructing a physical system (e.g., analog or digital electric circuit implementation); (b) providing a computer program-related means to numerically integrate the differential equations that define the chaotic encoding system (e.g., digital software implementation); (c) numerically solving equations defining the encoding system; (d) combining any of the above methods; or (e) providing any other means known by those of ordinary skill in the art. Similarly, the decoding system can be implemented by various methods including but not limited to: (a) constructing a physical system that inverts the dynamics of the encoding system; (b) providing a computer program-related means to invert the dynamics of the encoding system (e.g., digital software implementation); (c) numerically solving equations that invert the dynamics of the encoding system; (d) combining any of the above methods; or (e) providing any other means to invert the dynamics of the encoder known by those of ordinary skill in the art.

Other variations and modifications of the present invention will be apparent to those skilled in the art, and it is the intent of the appended claims that such variations and modifications be covered. The particular values and configurations discussed above can be varied and are cited merely to illustrate a particular embodiment of the present invention and are not intended to limit the scope of the invention. It is contemplated that the use of the present invention may involve components having different characteristics as long as the principle, the presentation of a chaos-based system for information encryption and decryption by direct decoding (inversion), is followed. It is intended that the scope of the present invention be defined by the claims appended hereto.

VI. REFERENCES CITED

The entire disclosures of all references, patents and publications, cited herein are hereby incorporated by reference. The following patents and publications have been cited herein:

1. Pecora et al., *Cascading Synchronized Chaotic Systems*, U.S. Pat. No. 5,379,346.
2. Gutowitz, *Method and Apparatus for Encryption, Decryption and Authentication Using Dynamical Systems*, U.S. Pat. No. 5,365,589.
3. Cuomo et al., *Communication Using Synchronized Chaotic Systems*, U.S. Pat. No. 5,291,555.
4. Pecora et al., *System for Producing Synchronized Signals*, U.S. Pat. No. 5,245,660.
5. Bianco et al., *Encryption System Based on Chaos Theory*, U.S. Pat. No. 5,048,086.
6. S. Hayes, C. Grebogi, E. Ott, and A. Mark, *Experimental Control of Chaos for Communication*, Phys. Rev. Lett. 73, 1781 (1994).
7. M. Ding and E. Ott, *Enhancing Synchronism of Chaotic Systems*, Phys. Rev. E. 945–948 (1994).
8. J. C. Sprott, *Automatic Generation of Strange Attractors*, Comput. & Graphics 17, 325 (1993).
9. K. M. Cuomo and A. V. Oppenheim, *Circuit Implementation of Synchronized Chaos with Applications to Communications*, Phys. Rev. Lett. 71, 65 (1993).
10. E. Ott, C. Grebogi, and J. A. Yorke, *Controlling Chaos*, Phys. Rev. Lett. 64, 1196 (1990).
11. L. M. Pecora and T. L. Carroll, *Synchronization in Chaotic Systems*, Phys. Rev. Lett. 64, 821 (1990).
12. E. O. Rössler, *An Equation for Continuous Chaos*, Phys. Lett. A57, 397 (1976).
13. E. N. Lorenz, *Deterministic Nonperiodic Flow*, J. Atmos. Sci. 20, 130–141 (1963).

We claim:

1. An encoding/decoding system, comprising:
   encoding means for encoding at least one encoder input signal, said encoding means comprising:
   receiving means for receiving at least one encoder input signal;
   at least one encoder system element;
   a dynamical system with its dynamics being characterized by a functional relationship between a plurality of state vector components of a state vector trajectory of said encoding means and being responsive to variations in the at least one encoder system element and the at least one encoder input signal, wherein at least one of the plurality of state vector components is time dependent;
   modulating means for varying the dynamics of the dynamical system; and
   generating means for generating at least one encoder output signal with the at least one encoder input signal convoluted therein;
   transmitting means for transmitting the at least one encoder output signal; and
   decoding means for decoding the at least one encoder output signal, said decoding means comprising:
   receiving means for receiving the at least one encoder output signal as at least one decoder input signal;
   at least one decoder system element;
   inverting means for operating on the at least one decoder input signal to directly reconstruct the at least one encoder input signal as a decoder output signal by inverting the dynamics of said encoding means, said inverting means being responsive to variations in the at least one decoder system element.

2. The encoding/decoding system as recited in claim 1, wherein the dynamical system is nonlinear.

3. The encoding/decoding system as recited in claim 1, wherein the dynamical system is caused to operate in a chaotic mode.

4. The encoding/decoding system as recited in claim 1, wherein the dynamical system is caused to operate in a non-chaotic mode.

5. The chaotic system as recited in claim 1, wherein the dynamical system is autonomous.

6. The chaotic system as recited in claim 1, wherein the dynamical system is nonautonomous.

7. The encoding/decoding system as recited in claim 1, wherein the at least one encoder input signal remains constant.

8. The encoding/decoding system as recited in claim 1, wherein the at least one encoder input signal varies as a function of time.

9. The encoding/decoding system as recited in claim 1, wherein the at least one decoder output signal is substantially identical to the at least one encoder input signal.

10. The encoding/decoding system as recited in claim 1, wherein the at least one encoder system element and the at least one decoder system element remain constant.

11. The encoding/decoding system as recited in claim 1, wherein the at least one encoder system element and the at least one decoder system element vary as a function of time.

12. The encoding/decoding system as recited in claim 1, wherein the at least one encoder system element and the at least one decoder system element are time delays.

13. The encoding/decoding system as recited in claim 1, wherein:
   the at least one encoder input signal modulates the at least one encoder system element thereby affecting the dynamics of said encoding means; and
   the at least one decoder output signal modulates the at least one decoder system element thereby affecting the function of the decoding means in a manner that corresponds to the affected dynamics of said encoding means.

14. The encoding/decoding system as recited in claim 1, wherein said encoding means is defined by the differential equation models:

$$\frac{dx(t)}{dt} = P_1 y(t) z(t) + P_2 m_1(t), \text{ and } \frac{dy(t)}{dt} = P_3 x(t) m_2(t) + P_4 y(t) + P_5,$$

$$\frac{dz(t)}{dt} = P_6 x(t) y(t) + P_7 y(t) + P_8 m_3(t),$$

where dx/dt, dy/dt, and dz/dt define the functional relationship between the plurality of state vector components of the state vector trajectory of the encoding means; $P_1$, $P_2$, $P_3$, $P_4$, $P_5$, $P_6$, $P_7$, and $P_8$ are the at least one encoder system element; $m_1(t)$, $m_2(t)$, and $m_3(t)$ are the at least one encoder input signal; and x(t), y(t), and z(t) are the at least one encoder output signal.

15. The encoding/decoding system as recited in claim 1, wherein said decoding means is defined by the equation models:

$$m_1(t) = \frac{\frac{dx(t)}{dt} - P_1 y(t) z(t)}{P_2}, \quad m_2(t) = \frac{\frac{dy(t)}{dt} - P_4 y(t) - P_5}{P_3 x(t)}, \text{ and}$$

$$m_3(t) = \frac{\frac{dz(t)}{dt} - P_6 x(t) y(t) - P_7 y(t)}{P_8},$$

where $m_1(t)$, $m_2(t)$, and $m_3(t)$ are the at least one decoder output signal; dx(t)/dt, dy(t)/dt, and dz(t)/dt define the functional relationship between the plurality of state vector components of the state vector trajectory of the encoding means; $P_1$, $P_2$, $P_3$, $P_4$, $P_5$, $P_6$, $P_7$, and $P_8$ are the at least one decoder system element; and x(t), y(t), and z(t) are the at least one decoder input signal.

16. The encoding/decoding system as recited in claim 14, further comprising an unknown functional relationship between the plurality of state vector components of the state vector trajectory of the encoding means as defined by the differential equation models:

$$\frac{dx(t)}{dt} = P_1 y(t)z(t) + P_2 m_1(t) + f_1(x,y,z),$$

$$\frac{dy(t)}{dt} = P_3 x(t)m_2(t) + P_4 y(t) + P_5 + f_2(x,y,z), \text{ and}$$

$$\frac{dz(t)}{dt} = P_6 x(t)y(t) + P_7 x(t) + P_8 m_3(t) + f_3(x,y,z),$$

where dx/dt, dy/dt, and dz/dt comprise the functional relationship between the plurality of state vector components of the state vector trajectory of the encoding means; $P_1$, $P_2$, $P_3$, $P_4$, $P_5$, $P_6$, $P_7$, and $P_8$ are the at least one encoder system element; $m_1(t)$, $m_2(t)$, and $m_3(t)$ are the at least one encoder input signal; x(t), y(t), and z(t) are the at least one encoder output signal; and $f_1(x,y,z)$, $f_2(x,y,z)$, and $f_3(x,y,z)$ are the unknown functional relationship.

17. The encoding/decoding system as recited in claim 15, further comprising an unknown functional relationship between the plurality of state vector components of the state vector trajectory of the encoding means as defined by the equation models:

$$m_1(t) = \frac{\frac{dx(t)}{dt} - P_1 y(t)z(t) - f_1(x,y,z)}{P_2},$$

$$m_2(t) = \frac{\frac{dy(t)}{dt} - P_4 y(t) - P_5 - f_2(x,y,z)}{P_3 x(t)}, \text{ and}$$

$$m_3(t) = \frac{\frac{dz(t)}{dt} - P_6 x(t)y(t) - P_7 x(t) - f_3(x,y,z)}{P_8},$$

where $m_1(t)$, $m_2(t)$, and $m_3(t)$ are the at least one decoder output signal; dx(t)/dt, dy(t)/dt, and dz(t)/dt define the functional relationship between the plurality of state vector components of the state vector trajectory of the encoding means; $P_1$, $P_2$, $P_3$, $P_4$, $P_5$, $P_6$, $P_7$, and $P_8$ are the at least one decoder system element; x(t), y(t), and z(t) are the at least one decoder input signal; and $f_1(x,y,z)$, $f_2(x,y,z)$, and $f_3(x,y,z)$ are the unknown functional relationship.

18. The encoding/decoding system as recited in claim 1, wherein the dynamical system and the inverting means are defined by an unknown functional relationship between the plurality of state vector components of the state vector trajectory of the encoding means.

19. The encoding/decoding system as recited in claim 1, wherein:

said encoding means comprises a plurality of interconnected encoders, wherein the plurality of interconnected encoders comprise a first encoder and a last encoder with a plurality of preceding and succeeding encoders operatively coupled therebetween, the first encoder having a succeeding encoder operatively coupled to the first encoder, each one of the succeeding encoders having a preceding encoder, the last encoder having a preceding encoder operatively coupled to the last encoder, the first encoder receiving and encoding the at least one encoder input signal, each one of the respective preceding encoders generating at least one chaotic output signal, the at least one chaotic output signal of each one of the respective preceding encoders being provided as a chaotic input signal to each one of the respective succeeding encoders, the last encoder providing at least one chaotic output signal as a chaotic input signal to said decoding means; and said decoding means comprises a plurality of interconnected set of decoders that correspond to and cooperate with the plurality of interconnected encoders, wherein the plurality of interconnected decoders comprise a first and last decoder with a plurality of preceding and succeeding decoders operatively coupled therebetween, the first decoder having a succeeding decoder operatively coupled to the first decoder, the interconnected decoder having a preceding decoder, the last encoder having a preceding decoder operatively coupled to the last decoder, each one of the respective preceding decoders generating at least one decoded output signal, the at least one decoded output signal of each one of the respective preceding decoders being provided as a decoded input signal to each one of the respective succeeding decoders, the last decoder directly reconstructing the at least one encoder input signal.

20. The encoding/decoding system as recited in claim 1, wherein the at least one encoder system element depends on the at least one encoder input signal in a time-delayed fashion.

21. The encoding/decoding system as recited in claim 20, wherein:

said encoding means comprises an encoder, an encoder buffer system, and an encoder transformation system, the encoder buffer system being operatively coupled to the encoder, and the encoder transformation system being operatively coupled to the encoder and to the encoder buffer system, wherein the encoder transformation system is located between the encoder and the encoder buffer system, the at least one encoder input signal being provided as an input to the encoder and to the encoder buffer system simultaneously, wherein the at least one encoder input signal is coupled to the at least one encoder system element, and wherein the at least one encoder output signal comprises the at least one encoder input signal and the at least one encoder system element convoluted therein; and said decoding means comprises a decoder that corresponds to the encoder, a buffer system that corresponds to the encoder buffer system, and a transformation system that corresponds to the encoder transformation system, the decoder buffer system being operatively coupled to the decoder, and the decoder transformation system being operatively coupled to the decoder buffer system, wherein the decoder transformation system is located between the decoder and the decoder buffer system, the at least one decoder output signal being provided as an input to the decoder buffer system until the decoder reconstructs the at least one encoder input signal.

22. The encoding/decoding system as recited in claim 1, wherein:

said encoding means comprises at least one iterative function that define the functional relationship between the plurality of state vector components of the state vector trajectory of the at least one encoding means; and said decoding means comprises at least one inverted iterative function model that define the functional relationship between the plurality of state vector components of a state vector trajectory of the at least one encoding means.

23. The iterative encoding/decoding system as recited in claim 22, wherein said encoding means is defined by the equation models: $x_{n+1}=P_1+P_2x_n+P_3x_n^2m_n+P_4x_ny_n+P_5y_n+P_6y_n^2$ and $y_{n+1}=P_7+P_8x_n+P_9x_n^2+P_{10}x_ny_n+P_{11}y_n+P_{12}y_n^2$, wherein $x_{n+1}$ and $y_{n+1}$ comprise the at least one iterative function; $P_1, P_2, P_3, P_4, P_5, P_6, P_7, P_8, P_9, P_{10}, P_{11}$, and $P_{12}$ are the at least one encoder system element; $m_n$ is the at least one encoder input signal; and $x_n$ and $y_n$ are the at least one encoder output signal.

24. The iterative encoding/decoding system as recited in claim 22, wherein said decoding means is defined by the equation model:

$$m_n = \frac{x_{n+1} - P_1 - P_2x_n - P_4x_ny_n - P_5y_n - P_6y_n^2}{P_3x_n^2}$$

where $m_n$ is the at least one decoder output signal; $x_{n+1}$ comprises the at least one inverted iterative function; and $P_1, P_2, P_3, P_4, P_5$, and $P_6$ are the at least one decoder system element.

25. A method of encoding and decoding information streams, comprising the steps of:

defining a functional relationship between a plurality of state vector components of a state vector trajectory of an encoding system, the definition including dynamics characterized by the functional relationship, wherein at least one of the plurality of state vector components is time dependent, the encoding system being a nonlinear dynamical system, the encoding system including and being dependent on at least one system element that affects the dynamics of the encoding system;

receiving at least one encoder input signal;

modulating the at least one system element of the encoding system with the at least one encoder input signal to affect the dynamics of the encoding system;

determining the at least one time dependent state vector component of the functional relationship for generating at least one output signal with the at least one encoder input signal convoluted therein;

transmitting the at least one output signal to a decoding means;

receiving the at least one output signal; and decoding the at least one output signal by inverting the dynamics of the encoding system to directly reconstruct the at least one encoder input signal using the at least one output signal.

26. The method as recited in claim 25, wherein said step of defining a functional relationship is achieved by defining a plurality of coupled differential equation models and said step of determining the time dependent state vector is achieved by integrating the coupled differential equation models.

27. The method as recited in claim 26, wherein said step of defining the encoding system with coupled differential equation models includes the step of causing the encoding system to operate in a chaotic mode.

28. The method as recited in claim 25, wherein said step of defining a functional relationship is achieved by defining a plurality of iterated function models and said step of determining the time dependent state vector is achieved by iterating the iterated function models.

29. The method as recited in claim 28, wherein said step of defining the encoding system with coupled iterated function models includes the step of causing the encoding system to operate in a chaotic mode.

* * * * *